US012443289B1

United States Patent
Kumar Agrawal et al.

(10) Patent No.: US 12,443,289 B1
(45) Date of Patent: Oct. 14, 2025

(54) DEFORMABLE ELECTRONIC DEVICES AND CORRESPONDING METHODS FOR MOVING FLASHLIGHT OUTPUT AS A FUNCTION OF A CHANGE IN ORIENTATION

(71) Applicant: Motorola Mobility LLC, Chicago, IL (US)

(72) Inventors: Amit Kumar Agrawal, Bangalore (IN); Panduranga Reddy Pailla, Nalgonda (IN); Vijayprakash Idlur, Yadgir (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/753,865

(22) Filed: Jun. 25, 2024

(51) Int. Cl.
*G06F 3/0346* (2013.01)
*G06F 3/01* (2006.01)

(52) U.S. Cl.
CPC ............ *G06F 3/0346* (2013.01); *G06F 3/013* (2013.01); *G06F 3/017* (2013.01)

(58) Field of Classification Search
CPC ......... G06F 3/0346; G06F 3/013; G06F 3/017
See application file for complete search history.

(56) References Cited

U.S. PATENT DOCUMENTS

| | | | | |
|---|---|---|---|---|
| 8,245,321 B2* | 8/2012 | Ambrosio | .......... | A41D 19/0041 2/160 |
| 9,524,662 B2* | 12/2016 | Kwon | .................... | G09G 3/035 |
| 9,635,255 B1* | 4/2017 | Baldwin | ................ | H04N 23/74 |
| 9,652,135 B2* | 5/2017 | Seo | ........................ | G06F 3/0485 |
| 9,785,232 B2* | 10/2017 | Cha | ........................ | G06F 3/0481 |
| 9,812,092 B2* | 11/2017 | Kurata | .................... | G06F 3/017 |
| 9,814,284 B2* | 11/2017 | Tamaki | ................. | G06F 1/1643 |
| 9,921,736 B2* | 3/2018 | Seo | ........................ | G06F 3/016 |
| 9,941,918 B2* | 4/2018 | Kim | ..................... | H04B 1/3827 |
| 10,168,821 B2* | 1/2019 | Chi | ........................ | G06F 3/041 |
| 10,289,163 B2* | 5/2019 | Huitema | ................. | G06F 1/163 |
| 10,372,164 B2* | 8/2019 | Huitema | ............... | G06F 3/0346 |
| 10,616,762 B2* | 4/2020 | Kang | ................... | G06F 1/3287 |
| 10,663,150 B1* | 5/2020 | Luna | ....................... | F21V 21/30 |
| 10,754,483 B2* | 8/2020 | Seo | ..................... | G06F 3/04166 |
| 10,813,193 B1* | 10/2020 | Agrawal | .............. | H05B 47/115 |
| 10,839,773 B2* | 11/2020 | Nemoto | .................... | G09G 5/38 |

(Continued)

OTHER PUBLICATIONS

"Nubia Watch", Flexible wristwatch; Unknown exact availability date but believed to be prior to filing of present application; Available online at https://www.nubiamart.com/nubia-watch.html?srsltid=AfmBOopV9m6natcLzCC8Q19r_8GSen9YwaVePoUZntvX44gQTAoCR-JA.

(Continued)

*Primary Examiner* — Grant Sitta
(74) *Attorney, Agent, or Firm* — Philip H. Burrus, IV

(57) ABSTRACT

A deformable electronic device includes a flexible display supported by a deformable housing and one or more sensors to detect a wrapped geometric form factor while in a flashlight mode of operation. The device presents flashlight output on the flexible display in a first location and detects gesture input translating the device in three-dimensional space. The device moves the flashlight output to a second location as a function of a change in orientation resulting from the translating. The device includes processors operable with sensors to dynamically adjust the flashlight output based on the device's orientation, ensuring effective illumination without causing glare to the user.

22 Claims, 8 Drawing Sheets

(56) References Cited

U.S. PATENT DOCUMENTS

| | | | |
|---|---|---|---|
| 10,907,776 B1* | 2/2021 | Haddad | F21S 4/22 |
| 10,908,640 B2* | 2/2021 | Yamazaki | G06F 1/1652 |
| 11,711,877 B2* | 7/2023 | Hosler | G04G 21/02 |
| | | | 315/149 |
| 2011/0187681 A1* | 8/2011 | Kim | G06F 3/0488 |
| | | | 345/204 |
| 2016/0098137 A1* | 4/2016 | Kim | G06F 3/04883 |
| | | | 345/173 |
| 2016/0342327 A1* | 11/2016 | Chi | G06F 3/04883 |
| 2018/0336866 A1* | 11/2018 | Triverio | G06F 3/017 |
| 2019/0033787 A1* | 1/2019 | Swanagin | A61B 5/681 |
| 2019/0150249 A1* | 5/2019 | Bertken | F21V 23/0414 |
| | | | 315/149 |
| 2020/0279539 A1* | 9/2020 | Triverio | G06F 3/04883 |
| 2021/0034111 A1* | 2/2021 | Son | H04M 1/0202 |
| 2024/0427377 A1* | 12/2024 | Emmert | H04M 1/0268 |

OTHER PUBLICATIONS

"The Most Futuristic Flexible Display Phone", YouTube; Unbox Therapy Channel; Nubia Alpha Watch; Premiered Mar. 29, 2029; available at https://www.youtube.com/watch?v=JbY8DM8c-h0&t=292s.

Mertens, Ron, "Samsung Flexible-display watch design patent surface", Posted Aug. 4, 2013; Available online at https://www.oled-info.com/samsung-flexible-display-watch-design-patent-surface.

Soriano, Eduardo Rojas, "Google Apps—Screen Flashlight", Google Play Apps; Available at https://play.google.com/store/apps/details?id=com.eduardo_rsor.apps.linternapantalla&hl=en&gl=US; unknown exact publication date but prior to filing of present application.

* cited by examiner

DEFORMABLE ELECTRONIC DEVICES AND CORRESPONDING METHODS FOR MOVING FLASHLIGHT OUTPUT AS A FUNCTION OF A CHANGE IN ORIENTATION

BACKGROUND

Technical Field

This disclosure relates generally to electronic devices, and more particularly to deformable electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in geometric configuration, has a rigid form factor, and has a display disposed along a major face of the electronic device. By contrast, a "clamshell" device has a mechanical hinge that allows one housing to pivot relative to the other.

Some consumers prefer fixed geometric configuration devices such as candy bar devices. However, many others prefer deformable electronic devices such as clamshell devices. It would be advantageous to have an improved electronic device can operate in both deformed and non-deformed states.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
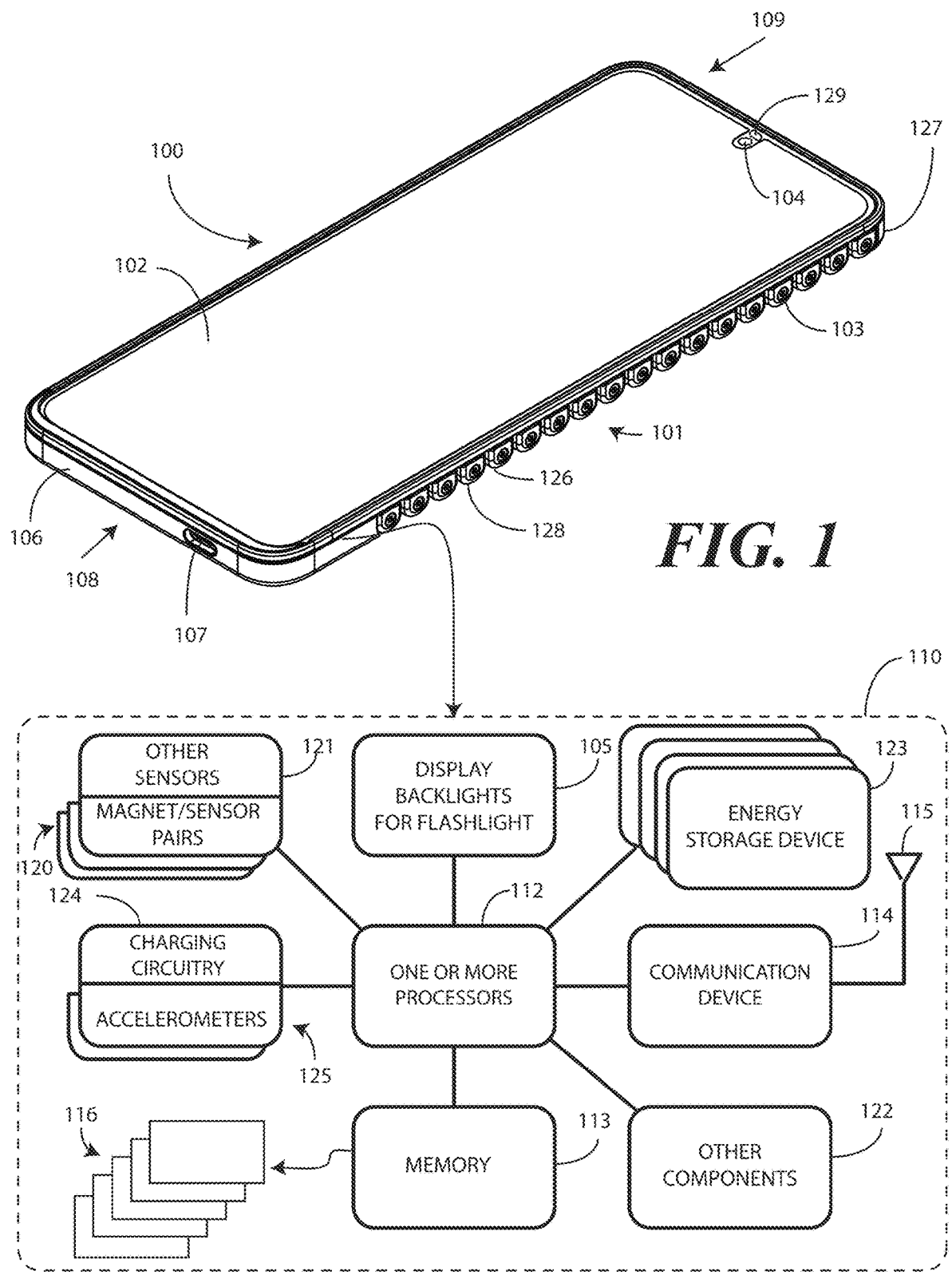
FIG. 1 illustrates one explanatory deformable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting, with one or more sensors a wrapped geometric form factor defined by a flexible display supported by a deformable housing while in a flashlight mode of operation, presenting, with one or more processors, flashlight output on the flexible display in a first location, detecting gesture input translating the electronic device in three-dimensional space while the wrapped geometric form factor is occurring, and moving the flashlight output in response to the translating to a second location as a function of a change in orientation of the electronic device in three-dimensional space. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of causing a flashlight output on the flexible display to move along the flexible display of a deformable electronic device as a function of the changes in the orientation of the deformable electronic device in the three-dimensional space while the electronic device is in the wrapped, wrist-worn geometric configuration as described herein. The non-processor circuits may include, but are not limited to, a radio receiver, a radio transmitter, signal drivers, clock circuits, power source circuits, and user input devices. As such, these functions may be interpreted as steps of a method to perform, in response to the at least a first sensor detecting the wrapped geometry about the wrist and the at least a second sensor detecting the rotational and/or lifting operation, causing, with one or more processors, flashlight output presented on a flexible display supported by the deformable device housing to move in proportion to the rotational and/or lifting operation.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

In the ever-evolving landscape of mobile technology, the use of a mobile phone's "flashlight" function where a light source configured as an image capture flash (or other light source) is turned on continuously to operate as a pseudo-flashlight has become an indispensable feature for many users. Traditionally, the flashlight function is provided by the camera's flashlight source or the device's display. Users tend to find that the flashlight function is incredibly handy, often replacing the need for a conventional electric torch. However, as designers of mobile devices continue to innovate, new form factors such as adaptive wearable displays present unique challenges for integrating this functionality.

Embodiments of the disclosure provide a deformable electronic device operating as an adaptive display device that can morph into various geometric form factors, including a flat screen geometric form factor, wearable geometric form factor, stand geometric form factor, and tent geometric form factor. This flexibility allows for a multitude of hardware and software use cases, but it also introduces specific challenges, particularly when the device is worn on the wrist.

Embodiments of the disclosure contemplate that when the deformable electronic device is in the wrist-worn geometric form factor, users face difficulties in effectively using the flashlight function. For instance, the user must wear the deformable electronic device in a specific orientation to ensure the flashlight points away from their eyes, thereby illuminating the desired area situated in front of the user. Embodiments of the disclosure also contemplate that if the wrist moves or the user glances at the deformable electronic device while walking, the flashlight output may inadvertently point towards the user's eyes, obstructing their natural movement and causing discomfort.

To address these issues, the embodiments of the disclosure advantageously provide a novel solution for managing the flashlight functionality on a contextual portion of an adaptive wearable display device. In one or more embodiments, the solution involves determining the present geometric form factor of the adaptive display device and detecting when it is in a wrist-worn geometric form factor.

By utilizing inertial measurement units (IMUs), flex sensors, and/or other sensors, in one or more embodiments one or more processors of the deformable electronic device can detect the orientation of the display in three-dimensional space, as well as identify the non-viewing areas of the flexible display. In response to changes in the viewing area, in one or more embodiments the deformable electronic device automatically adjusts the flashlight output to illuminate the portion of the flexible display that is not in the user's direct line of sight. This ensures that the flashlight function is effectively utilized without causing glare or discomfort to the user.

Additionally, embodiments of the disclosure also include an alternate embodiment where users can activate the flashlight using a specific gesture, such as a "chop chop" motion in three-dimensional space. This gesture-based control provides an intuitive and convenient way to enable the flashlight function, further enhancing the user experience. By enabling a specific portion of the deformable display device to function as a flashlight based on ambient lighting conditions, embodiments of the disclosure offer a practical and user-friendly solution to the challenges posed by adaptive wearable displays.

In one or more embodiments, a method in an electronic device comprises detecting, with one or more sensors, a wrapped geometric form factor defined by a flexible display supported by a deformable housing while in a flashlight mode of operation. In one or more embodiments, the method comprises presenting, with one or more processors, flashlight output on the flexible display in a first location.

In one or more embodiments, the method comprises also detecting, with one or more other sensors, gesture input translating the electronic device in three-dimensional space while the wrapped geometric form factor is occurring. Thereafter, in one or more embodiments the method comprises moving, by the one or more processors, the flashlight output on the flexible display in response to the translating to a second location as a function of a change in orientation of the electronic device in three-dimensional space resulting from the translating.

Advantageously, by detecting a wrapped geometric form factor defined by a flexible display supported by a deformable housing, the electronic device can dynamically adapt to different physical configurations, such as being worn on the wrist. This adaptability allows the device to provide a more versatile user experience, accommodating various use cases and ergonomic requirements.

Presenting flashlight output on the flexible display in a first location ensures that the device can initially provide illumination in a predefined area, which can be optimized for typical usage scenarios. This default positioning of the flashlight output enhances usability by providing immediate and predictable lighting when the flashlight mode is activated.

Detecting gesture input that translates the electronic device in three-dimensional space while the wrapped geometric form factor is occurring allows the device to respond to user movements in real-time. This capability ensures that the flashlight output can be dynamically adjusted based on the orientation and position of the device, providing consistent and effective illumination regardless of how the user moves their wrist.

Moving the flashlight output in response to the translating to a second location as a function of a change in orientation of the electronic device in three-dimensional space ensures that the light source is always directed away from the user's eyes and towards the area that needs illumination. This automatic adjustment prevents glare and enhances user comfort, particularly in scenarios where the user is moving or needs to frequently check the device while using the flashlight function.

Advantageously, embodiments of the disclosure provide a novel solution for managing the flashlight functionality on a contextual portion of an adaptive wearable display device. In one or more embodiments, the solution begins by determining that the electronic device is an adaptive display device capable of transforming into different form factors dynamically. Once the device is identified as being in a wearable accessory mode, where it is wrapped around the wrist, in one or more embodiments the system provides a default mode, which is sometimes known as the "ergonomic view." In this mode, it is assumed that the user does not intend to move the device while moving their forearm or wrist.

To enhance the usability of the flashlight function, in one or more embodiments the system detects that the environment is dark, and that the user is moving, or it responds to an explicit trigger to use the device as a flashlight. Utilizing inertial measurement units, flex sensors, and/or other sensors, in one or more embodiments the system detects the orientation of the device in three-dimensional space, thereby allowing one or more processors of the electronic device to determine the probable non-viewing area of the flexible display. In response to changes in the probable viewing area, in one or more embodiments the system automatically illuminates the portion of the display that is considered to be in a non-viewable area. This ensures that the flashlight function is effectively utilized without causing glare or discomfort to the user.

In an alternate embodiment, the user can also execute a specific gesture, such as the "chop chop" motion, to enable the flashlight function. This gesture-based control provides an intuitive and convenient way to activate the flashlight function, further enhancing the user experience. By enabling a specific portion of the deformable display device to function as a flashlight based on ambient lighting conditions, the invention offers a practical and user-friendly solution to the challenges posed by adaptive wearable displays.

In summary, embodiments of the disclosure enable a specific portion of the deformable display device, which is opposite to the user's view, to function as a flashlight. In one or more embodiments, this is done further as a factor of ambient lighting, ensuring that the light illuminates the area away from the user and avoids falling into the user's glare. This innovative approach leverages the unique form factor of the adaptive wearable display to provide a more effective and comfortable flashlight experience.

In one or more embodiments, an electronic device comprises a deformable housing comprises a plurality of linkage members and a flexible display supported by the deformable housing. In one or more embodiments, the electronic device comprises one or more sensors operable to determine a wrapped, wrist-worn geometric configuration of the electronic device, one or more other sensors operable to detect when the electronic device changes orientation in three-dimensional space, and one or more processors operable with the one or more sensors and the one or more other sensors. In one or more embodiments, the one or more processors are operable to cause a flashlight output on the flexible display to move along the flexible display as a function of the changes in the orientation of the electronic device in the three-dimensional space while the electronic device is in the wrapped, wrist-worn geometric configuration Variations of the electronic device are provided as well. Illustrating by example, in one embodiment the electronic device comprises a deformable housing made from a series of interconnected linkage members that provide structural flexibility while maintaining durability. The flexible display supported by this housing can be an organic light emitting diode display or active matrix organic light emitting diode display, each of which offers high resolution and brightness, ensuring clear visibility even in various lighting conditions.

The one or more sensors operable to determine a wrapped, wrist-worn geometric configuration can include inertial measurement units, flex sensors, and/or other sensors that accurately detect the device's orientation and curvature around the wrist. However, in another embodiment, the sensors may also include capacitive touch sensors that detect the contact and pressure points on the display, providing additional data for determining the device's configuration.

In one or more embodiments, the one or more other sensors operable to detect changes in orientation in three-dimensional space can include gyroscopes and accelerometers, which provide precise measurements of rotational and translational movements. The one or more processors, which can be multi-CPUs or specialized artificial intelligence processors, are operable to process the sensor data in real-time, enabling the flashlight output to move dynamically along the flexible display. This movement can be based on predefined algorithms that consider the user's typical wrist movements and ambient lighting conditions.

In yet another embodiment, the electronic device may also include an image capture device, such as a miniaturized camera, that captures images of the user's eye to determine the gaze direction. This allows the processors to adjust the flashlight output to avoid the user's direct line of sight, enhancing user comfort.

In one or more embodiments, the flexible display can be divided into multiple segments, each capable of independent illumination, allowing for more precise control of the flashlight output. This segmentation can be particularly useful in scenarios where the user needs to illuminate specific areas without affecting the entire display. Additionally, the device can support gesture-based controls, such as a "chop chop" motion, to quickly activate or deactivate the flashlight, providing an intuitive user experience. These various embodiments demonstrate the adaptability and versatility of the electronic device within the legal and functional scope defined by the patent claims below.

In one or more embodiments, a method in an electronic device comprises detecting, with at least a first sensor, a deformable device housing of the electronic device being transitioned to a wrapped geometry about a wrist. In one or more embodiments, the method comprises detecting, with at least a second sensor, a rotational and/or lifting operation of the electronic device in three-dimensional space.

In one or more embodiments, in response to the at least a first sensor detecting the wrapped geometry about the wrist and the at least a second sensor detecting the rotational and/or lifting operation, the method comprises causing, with one or more processors, flashlight output presented on a flexible display supported by the deformable device housing to move in proportion to the rotational and/or lifting operation. In one or more embodiments, an outward facing vector extending distally from the flashlight output is oriented in a constant direction during the rotational and/or lifting operation.

Thus, while prior art devices offer a flashlight function, when this function is integrated into adaptive wearable display devices, particularly when worn on the wrist, challenges arise. With prior art devices, users are required to navigate the complexities of ensuring the flashlight points in the desired direction while accommodating the device's flexible form factor.

Additionally, current solutions for flashlight functionality on mobile devices face several limitations. Users wear the device in a specific orientation to ensure the flashlight points away from their eyes, which can be cumbersome and inconvenient. Additionally, if the wrist moves or the user glances at the device while walking, the flashlight output may inadvertently point towards the user's eyes, causing discomfort and obstructing natural movement. These issues highlight the need for a more intuitive and adaptable solution for managing flashlight functionality on wearable devices.

Advantageously, embodiments of the present disclosure address these challenges by providing a novel solution for managing the flashlight functionality on a contextual portion of an adaptive wearable display device. In one or more embodiments, the solution involves determining the present geometric form factor of the adaptive display device and detecting when the adaptive display device is in a wrist-worn geometric form factor. By utilizing inertial measurement units, flex sensors, and other sensors, the system can detect the orientation of the display in three-dimensional space and identify the non-viewing areas of the flexible display.

In response to changes in the viewing area, the system automatically adjusts the flashlight output to illuminate the portion of the flexible display that is not in the user's direct line of sight in one or more embodiments. Advantageously, this ensures effective utilization of the flashlight function without causing glare or discomfort to the user. Other advantages will be described below. Still others will be obvious to those of ordinary skill in the art having the benefit of this disclosure.

Turning now to FIG. 1, illustrated therein is one explanatory deformable electronic device 100 configured in accordance with one or more embodiments of the disclosure. The deformable electronic device 100 of FIG. 1 is a portable electronic device. In one or more embodiments, the deformable electronic device 100 includes a deformable link assembly 101 comprising a plurality of linkage members. In one or more embodiments, each linkage member includes a corresponding pivot member 103 that allow the deformable electronic device 100 to be selectively deformed by bending or folding. Advantageously, this allows the deformable electronic device 100 to function as an equivalent to multiple devices depending upon the amount of deformation of the deformable link assembly 101.

For example, the deformable electronic device 100 is shown in an undeformed configuration in which the deformable electronic device 100 is generally flat and substantially planar in FIG. 1. In such a configuration, the deformable electronic device 100 can function as a smartphone, palmtop computer, or tablet computer. However, as will be shown below with reference to FIG. 3, in another embodiment the deformable electronic device 100 can be folded into a tent geometric configuration, in a pad orientation, and can accordingly function as a table clock, content viewer, or auxiliary display when such a condition. It should be obvious to those of ordinary skill in the art having the benefit of this disclosure that the deformable electronic device 100 can function as other devices as a function of its physical geometry, including as a gaming device, a media player, or other device.

This illustrative deformable electronic device 100 includes a display 102, which may optionally be touch-sensitive. In one embodiment where the display 102 is touch-sensitive, the display 102 can serve as a primary user interface of the deformable electronic device 100. Users can deliver user input to the display 102 of such an embodiment by delivering touch input from a finger, stylus, or other objects disposed proximately with the display.

In one embodiment, the display 102 is configured as an organic light emitting diode (OLED) display fabricated on a flexible plastic substrate. However, it should be noted that other types of displays would be obvious to those of ordinary skill in the art having the benefit of this disclosure.

In one or more embodiments, an OLED is constructed on flexible plastic substrates can allow the display 102 to become a flexible display in one or more embodiments with various bending radii. For example, some embodiments allow bending radii of between thirty and six hundred millimeters to provide a bendable display. Other substrates allow bending radii of around five millimeters to provide a display that is foldable through active bending. Other flexible displays can be configured to accommodate both bends and folds. In one or more embodiments the flexible display may be formed from multiple layers of flexible material such as flexible sheets of polymer or other materials.

The explanatory deformable electronic device 100 of FIG. 1 also includes a deformable link assembly 101 comprised of a plurality of linkage members. In one or more embodiments, each linkage member includes one or more pivot members 103. Explanatory operation of one or more embodiments of the deformable link assembly 101 is described in commonly assigned U.S. patent application Ser.

No. 18/213,679, filed Jun. 23, 2023, entitled "Deformable Electronic Devices and Methods for Constructing the Same," which is incorporated by reference herein for all purposes.

The pivot members 103, which each include a pivot shaft having its central axis aligned substantially parallel with the surface defined by the display 102, and which each engage a plurality of links that are interleaved in an overlapping arrangement, allow portions of the deformable link assembly 101 to pivot about each linkage member so that the deformable electronic device 100 becomes bendable and/or foldable.

In one or more embodiments, a flexible substrate is situated beneath the display 102. In one or more embodiments, the flexible substrate provides intermediary support structure between the display 102 and the deformable link assembly 101.

In the illustrative embodiment of FIG. 1, the display 102 abuts a major surface of the flexible substrate on an opposite side of the flexible substrate relative to the deformable link assembly 101. In one embodiment, the lower surface of the display 102, or another layer in the mechanical stack-up of the display 102, can be adhered to the flexible substrate on one side of the flexible substrate while the deformable link assembly 101, or alternatively to portions of the deformable link assembly 101, are adhered to the other side of the flexible substrate. In this illustrative embodiment, the display 102 also spans the pivot members 103 of each linkage member. In this illustrative embodiment, the display 102 is flexible so as to deform when the deformable link assembly 101 bends around the pivot members 103.

Features can be incorporated into the deformable electronic device 100. Examples of such features include an optional image capture device 104 or an optional speaker port 129. A user interface component, which may be a button or touch sensitive surface, can also be disposed along a side of an electronic circuit component housing 106. The deformable electronic device 100 can also include one or more connectors 107, which can be an analog connector, a digital connector, or combinations thereof.

A block diagram schematic 110 of the deformable electronic device 100 is also shown in FIG. 1. The block diagram schematic 110 can be configured as a printed circuit board assembly disposed within the electronic circuit component housing 106. Various components can be electrically coupled together by conductors, or a bus disposed along one or more printed circuit boards. A flexible substrate can then span the pivot members 103 to electrically couple electronic circuits situated in the electronic circuit component housing 106 to other components situated within another electronic circuit component housing 127, wherein included, together.

In one or more embodiments, the deformable electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the deformable electronic device 100. Each of the application processor and the auxiliary processor(s) can be configured to process and execute executable software code to perform the various functions of the deformable electronic device 100. A storage device, such as memory 113, can optionally store the executable software code used by the one or more processors 112 during operation.

In this illustrative embodiment, the deformable electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the deformable electronic device 100. For example, in one embodiment the one or more processors 112 comprise one or more circuits operable with one or more user interface devices, which can include the display 102, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the deformable electronic device 100. The operating system environment can include a kernel and one or more drivers, and an application service layer, and an application layer. The operating system environment can be configured as executable code operating on one or more processors or control circuits of the deformable electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the deformable electronic device 100 optionally includes one or more magnet magnetometer pairs 120, operable with the one or more processors 112, to detect a bending operation that causes the deformable link assembly 101 to deform, thereby transforming the deformable electronic device 100 into a deformed geometry, such as that shown in FIGS. 2-7. In one or more embodiments, each magnet magnetometer pair 120 is situated in a linkage member of the plurality of linkage members defining the deformable link assembly 101 such that the magnetometer of each magnet magnetometer pair 120 is situated in a linkage member of the plurality of linkage members and at least one corresponding magnet is situated in another linkage member of the plurality of linkage members that is adjacent to the linkage member in which the magnetometer is situated.

Illustrating by example, if a magnet of one magnet magnetometer pair 120 is situated in linkage member 126, at least one corresponding magnet may be situated in linkage member 128, which is adjacent to linkage member 126. This adjacent positioning of the magnetometer and corresponding magnet of each magnet magnetometer pair 120 allows the one or more processors 112 to identify a deformed geometric configuration of the deformable electronic device 100 from signals received from the magnetometers of the magnet magnetometer pairs 120.

In the illustrative embodiment of FIG. 1, the magnet magnetometer pairs 120 comprise at least three magnet magnetometer pairs. Moreover, in one or more embodiments each magnet magnetometer pair is separated from each other magnet magnetometer pair by at least one linkage member of the plurality of linkage members defining the deformable link assembly 101.

However, more magnet magnetometer pairs 120 can be added as well. For instance, in other embodiments, every linkage member of the deformable link assembly 101 can include either a magnet or a magnetometer of a magnet magnetometer pair 120. Thus, it should be understood that embodiments of the disclosure can have as few as one magnet magnetometer pair 120 or as many as the number of linkage members.

In the illustrative embodiment of FIG. 1, the plurality of linkage members defining the deformable link assembly 101 comprises at least fifteen linkage members. Like the number of magnet magnetometer pairs 120, this number can vary as well. Increasing the number of linkage members allows for tighter bending radii, while decreasing the number of linkage members simplifies the design and reduces the part count necessary to construct the deformable electronic device 100.

In one or more embodiments at least some of the linkage members of the plurality of linkage members defining the deformable link assembly 101 house one or more rechargeable electrochemical cells. In the illustrative embodiment of FIG. 1, each linkage member of the plurality of linkage members defining the deformable link assembly 101 houses a rechargeable electrochemical cell pair.

In one or more embodiments, the magnetometer of odd instances of the linkage members housing the rechargeable electrochemical cell pairs is situated between a first pair of rechargeable electrochemical cells situated within the odd instances of the linkage members housing the rechargeable electrochemical cell pairs. The corresponding magnets of the magnet magnetometer pair 120 of even instances of the linkage members housing the rechargeable electrochemical cell pairs is then situated between a second pair of rechargeable electrochemical cells situated within the even instances of the linkage members housing the rechargeable electrochemical cell pairs.

This "between the cells" positioning of the magnet or magnetometer of each magnet magnetometer pair 120 allows for the determination of a wide range of deformable geometric configurations while using only a small number of magnet magnetometer pairs 120. However, in other embodiments, either the magnetometers or magnets can be situated outside the rechargeable electrochemical cell pairs as well. Other configurations will be obvious to those of ordinary skill in the art having the benefit of this disclosure.

Accelerometers 125 can be used in conjunction with the magnet magnetometer pairs 120. Illustrating by example, a first accelerometer can be positioned in the electronic circuit component housing 106, while a second accelerometer is situated within another electronic circuit component housing 127.

In this illustrative embodiment, the electronic circuit component housing 106 is situated to one side of the plurality of linkage members defining the deformable link assembly 101, while the other electronic circuit component housing 127 is situated to another side of the plurality of linkage members defining the deformable link assembly 101.

In one or more embodiments, the one or more processors 112 can use the magnet magnetometer pairs 120 to detect a deformed or undeformed state of the deformable electronic device 100 and can then use the accelerometers 125 to distinguish orientations of those geometric configurations. Illustrating by example, in one or more embodiments the one or more processors 112 are configured to distinguish between the L pad geometric configuration and the L stand geometric configuration, or alternatively between the tent pad geometric configuration and the tent lean back geometric configuration, using signals received from the first accelerometer and the second accelerometer. Techniques for doing this will be described below. Others will be obvious to those of ordinary skill in the art having the benefit of this disclosure.

In one embodiment, the one or more processors 112 may generate commands or execute control operations based on information received from the various sensors, including the one or more magnet magnetometer pairs 120, the accelerometers 125, the user interface, or the other sensors 121. The one or more processors 112 may also generate commands or execute control operations based upon information received from a combination of the one or more magnet magnetometer pairs 120, the accelerometers 125, the user interface, or the other sensors 121. Alternatively, the one or more processors 112 can generate commands or execute control operations based upon information received from the one or more magnet magnetometer pairs 120 and the accelerometers 125 alone. Moreover, the one or more processors 112 may process the received information alone or in combination with other data, such as the information stored in the memory 113.

In one or more embodiments, the one or more processors 112 are also operable to actuate the image capture device 104 under certain conditions. Illustrating by example, in one or more embodiments the one or more processors 112 can execute a method that actuates the image capture device 104 in the electronic device 100 that causes the image capture device 104 to capture visual content such as images and videos.

In one or more embodiments, the electronic device comprises one or more display backlight elements 105 that are operable to project a flashlight output from all or a portion of the display 102 to provide a flashlight function for the electronic device 100. This functionality is particularly advantageous when the electronic device 100 is in a wrist-worn geometric form factor. In this configuration, the one or more display backlight elements 105 are configured to project light from only a portion of the display 102. This selective illumination allows content or other information to be presented on other portions of the display 102 that are visible to the user, ensuring that the flashlight function does not interfere with the device's primary display capabilities.

The one or more display backlight elements 105 work by utilizing a series of light-emitting diodes (LEDs) or other light sources strategically placed behind the flexible display 102. In one or more embodiments, these backlight elements can be individually controlled to illuminate specific areas of the display 102. When the electronic device 100 is in a flashlight mode of operation, the one or more backlight elements 105 corresponding to the non-viewing areas of the display 102 are activated, projecting light in the form of flashlight output outward to serve as a flashlight. Meanwhile, the other backlight elements corresponding to the viewing areas remain off, allowing the display 102 to present content or other information to the user without obstruction.

In one alternate embodiment, the display backlight elements 105 can be configured to provide variable brightness levels. This allows the user to adjust the intensity of the flashlight function based on the ambient lighting conditions or specific needs. For instance, in a very dark environment, the display backlight elements 105 can be set to a higher brightness level to provide more illumination, while in a moderately lit environment, a lower brightness level can be used to conserve battery life.

Another alternate embodiment involves the use of segmented backlight control. In this configuration, the display 102 is divided into multiple segments, each with its own set of display backlight elements 105. This segmentation allows for more precise control of the flashlight function, enabling the one or more processors 112 of the electronic device 100 to illuminate only the necessary portions of the display 102 while keeping other segments available for content presentation. This is particularly useful in scenarios where the user needs to illuminate specific areas without affecting the entire display.

In one or more embodiments, the one or more processors 112 control the one or more display backlight elements 105, thereby instructing the same to enter or exit the flashlight mode of operation based on specific detected conditions. This actuation capability allows the electronic device 100 to function like a flashlight when it is wrapped around a user's wrist in a specific geometric form factor, and optionally moved in accordance with a predefined gesture in three-dimensional space.

Illustrating by example, in one or more embodiments the display backlight elements 105 can be integrated with gesture-based controls. For example, a specific gesture, such as a "chop chop" motion, can be used to quickly activate or deactivate the flashlight function. This provides an intuitive and convenient way for the user to control the flashlight without navigating through menus or settings.

The advantages of these alternate embodiments are manifold. Variable brightness levels offer flexibility and energy efficiency, allowing the user to customize the flashlight function to their needs while conserving battery life. Segmented backlight control provides precision and versatility, enabling the device to serve multiple functions simultaneously without compromising on performance. Gesture-based controls enhance the user experience by providing quick and easy access to the flashlight function, making it more user-friendly and accessible.

Overall, the one or more display backlight elements 105 of FIG. 1 offer a sophisticated and adaptable solution for integrating a flashlight function into an adaptive wearable display device. By selectively illuminating portions of the display 102, the one or more processors 112 of the electronic device 100 can effectively serve as a flashlight while still presenting content or other information to the user, thereby enhancing both functionality and user experience.

In one or more embodiments, one or more sensors 121 are embedded within the electronic device 100 and are configured to detect a variety of conditions and inputs. These sensors may include, but are not limited to, accelerometers, gyroscopes, magnetometers, proximity sensors, and flex sensors, which can include the magnet magnetometer pairs 120.

In one or more embodiments, the one or more sensors 121 can be capable of detecting the wrapped geometric form factor defined by the flexible display 102 supported by a deformable housing, which is indicative of the electronic device 100 being worn on the user's wrist. Additionally, the one or more sensors 121 can be operable to detect gesture input as well. Illustrating by example, the one or more sensors 121 can a "chop chop" motion moving the electronic device 100 up and down in three-dimensional space to actuate the flashlight function.

The one or more processors 112, which can serve as the central processing unit(s) of the electronic device 100, execute instructions and coordinating the operations of various components, examples of which can be stored as modules 116 within the memory 113. The one or more processors 112 are operable with the one or more sensors 121 to process the detected conditions, such as the wrapped, wrist-worn geometric configuration and gaze cone of a user.

Once the flashlight function is actuated, the one or more sensors 121 can monitor for changes of the orientation of the electronic device 100 in three-dimensional space. Upon detecting such a change in orientation, in one or more embodiments the one or more processors 112 are configured to cause a flashlight output on the display 102 to move along the display 102 as a function of the changes in the orientation of the electronic device 100 in the three-dimensional space while the electronic device 100 is in the wrapped, wrist-worn geometric configuration.

In one or more embodiments, the electronic device 100 comprises an image capture device 104 that is operable to capture one or more images of an eye of a wearer of the electronic device 100 to determine a first portion of the display 102 upon which a gaze of a wearer is directed. In one or more embodiments, the one or more processors 112 are configured to cause the one or more display backlight elements 105 to present the flashlight output on a second portion of the display 102 upon which the wearer is not gazing, rather than the first portion of the display 102 upon which the gaze of the wearer is directed. In one or more embodiments, this causes the flashlight output to be, especially initially, presented outside the direction of the wearer so as not to project in the wearer's eyes.

Advantageously, embodiments of the disclosure allow the one or more processors 112 to automatically move the flashlight output being presented from a portion of the display 102 from a first location to a second location as a function of a change in orientation of the electronic device 100 in three-dimensional space. For instance, if the flashlight output is initially presented from a default location at a predefined portion of the display 102, and one or more sensors 121 detect gesture input translating the electronic device 100 in three-dimensional space while the wrapped geometric form factor is occurring, in one or more embodiments the one or more processors 112 will move the flashlight output to emanate from a different portion of the flexible display 102 that is selected as a function of a change in orientation of the electronic device 100 in three-dimensional space due to the translation.

Advantageously, this allows the flashlight output to remain directed away from the eyes of a user regardless of how they move their arm in three-dimensional space. In one or more embodiments, the one or more processors 112 can estimate a probable visible location for the display 102 relative to a gaze of a wearer of the electronic device 100. Once this occurs, the second location from which the flashlight output emanates may be outside the probable visible location of the flexible display 102.

In one or more embodiments, the one or more processors 112 can use an image capture device 104 to detect a gaze cone of a wearer of the electronic device 100. In one or more embodiments, the second location is situated such that the flashlight output is not directed toward an apex of that gaze cone, but rather toward the base of the gaze cone such that the user can continue to see the content being presented within the gaze cone after moving their arm in three-dimensional space.

In one or more embodiments, the first location and second location from which the flashlight output emanates are both on the bottom of the electronic device 100. Said differently, in one or more embodiments the first location and the second location span portions of the flexible display where a direction of gravity exits the display 102 in a downward direction. Thus, if a person inverts their wrist, the content still stays on the lower portions of the electronic device 100 with the direction of gravity exiting the nadir of the display 102. In such a situation, the first location, prior to the inversion, would span a portion of the flexible display 102 where the direction of gravity exits a surface of the portion of the flexible display 102 in a downward direction, while the second location would span another portion of the flexible display 102 where the direction of gravity exits another surface of another portion of the flexible display in a downward direction.

However, in other embodiments, such as when the user raises their wrist such that the direction of gravity passes through a looped defined by the wrapped geometric form factor, the direction of gravity would fail to intersect exterior surfaces the flexible display 102 after the translating. In still other embodiments, the second situation is always situated atop the ulna bone of the wrist of a wearer of the electronic device 100.

Since the wrapped geometric form factor can be created both when the electronic device 100 is positioned about a wrist and when there is no wrist within the wrapped geometric form factor, in one or more embodiments moving the flashlight output only occurs when the wrapped geometric form factor is wrist-worn. Said differently, in one or more embodiments the one or more sensors 121 can identify whether the wrapped geometric form factor is in a wrist-worn condition. In one or more embodiments, the movement of flashlight output along the flexible display 102 only occurs when the wrist-worn condition is occurring.

Other examples and features offered by the electronic device 100, which comprises a device housing comprising a plurality of linkage members, a flexible display 102 supported by the deformable housing, one or more sensors, such as those defined by the one or more magnet magnetometer pairs 120, to determine a wrapped, wrist-worn geometric configuration of the electronic device 100 and one or more other sensors 121 to detect when the electronic device changes 100 orientation in three-dimensional space, and one or more processors 112 operable to cause a flashlight output from the flexible display to move along the flexible display as a function of changes in the orientation of the electronic device 100 in three-dimensional space while the electronic device 100 is in the wrapped, wrist-worn geometric configuration will be described below. Still others will be obvious to those of ordinary skill in the art having the benefit of this disclosure.

In one or more embodiments, the electronic device 100 comprises the deformable housing, the flexible display 102, one or more sensors to detect a wrapped geometry, such as those defined by magnet magnetometer pairs 120, one or more other sensors 121, an image capture device 104, and one or more processors 112. In one or more embodiments, the deformable housing includes a plurality of linkage members found in a deformable link assembly 101 and supports the flexible display 102. This deformable link assembly 101 allows the flexible display 102 to maintain a wrapped, wrist-worn geometric configuration, one example of which will be described below with reference to FIG. 8. This configuration is detectable by the one or more sensors defined by magnet magnetometer pairs 120, which are operable to determine when the electronic device 100 assumes the wrapped geometric form factor indicative of being worn on a user's wrist.

The display 102, supported by the deformable housing, is capable of presenting visual content and can be manipulated into various geometric configurations to suit different use cases. The one or more processors 112 facilitate movement of both content and a flashlight output along the flexible display 102 when the electronic device 100 translates in three-dimensional space. The one or more sensors defined by magnet magnetometer pairs 120 work in conjunction with the flexible display 102 to facilitate the detection of the electronic device's geometric configuration.

The one or more other sensors 121 can even be operable to detect when the electronic device 100 is supported in a camcorder orientation in three-dimensional space. These sensors 121 may include accelerometers, gyroscopes, and other motion-detecting components that can sense the orientation and movement of the electronic device 100 relative to the user's body and the surrounding environment. When in the camcorder orientation, in one or more embodiments the one or more processors 112 cause the flashlight output to emanate from atop the ulna bone of the wrist of a wearer.

The image capture device 104 is a component of the electronic device 100 that is responsible for capturing visual content, such as photos and videos. The image capture device 104 is operable with the one or more processors 112, which serve as the central processing unit(s) for the electronic device 100. These one or more processors 112 are responsible for executing instructions, processing data, and controlling the operation of the electronic device 100. The one or more processors 112 are operable with one or more sensors and one or more other sensors to cause a flashlight output from the display 102 to move along the display 102 as a function of changes in the orientation of the electronic device 100 in three-dimensional space while the electronic device 100 is in a wrapped, wrist-worn geometric configuration.

In one or more embodiments, the image capture device 104 determines a direction of gaze from a wearer of the electronic device 100. The one or more processors 112 cause the flashlight output presentation to initially be presented away from an apex of the gaze cone from the wearer, as detected by the image capture device 104. Furthermore, the image capture device 104, in conjunction with the one or more processors 112, can enable the presentation of angle lines illustrating a direction at which the flashlight output is directed. In one or more embodiments, a user can interact with these angle lines to change the output cone of the flashlight output. In other embodiments, the angle lines provide visual guidance to the wearer regarding where the flashlight output is currently aimed at or illuminating.

The one or more other sensors 121 may further include a microphone, an earpiece speaker, a second loudspeaker, and a user interface component such as a button or touch-sensitive surface. The one or more other sensors 121 may include one or more of an accelerometer, gyroscope, image capture device, and/or display touch sensors to determine whether the deformable electronic device 100 is being held by a first side or a second side in a portrait mode.

The one or more other sensors 121 may also include key selection sensors, proximity sensors, a touch pad sensor, a touch screen sensor, a capacitive touch sensor, and one or more switches. Touch sensors may be used to indicate whether any of the user actuation targets present on the display 102 are being actuated. Alternatively, touch sensors disposed in the deformable electronic device 100 can be used to determine whether the deformable electronic device 100 is being touched at side edges or major faces of the deformable link assembly 101. The touch sensors can include surface and/or housing capacitive sensors in one embodiment. The other sensors 121 can also include audio sensors and video sensors (such as a camera).

The other sensors 121 can also include motion detectors, such as one or more accelerometers or gyroscopes. For example, an accelerometer may be embedded in the electronic circuitry of the deformable electronic device 100 to show vertical orientation, constant tilt and/or whether the deformable electronic device 100 is stationary. A gyroscope can be used in a similar fashion.

Other components 122 operable with the one or more processors 112 can include output components such as video outputs, audio outputs, and/or mechanical outputs. Examples of output components include audio outputs such as speaker port 129, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the deformable electronic device 100 comprises a plurality of energy storage devices 123. In one or more embodiments, each energy storage device of the plurality of energy storage devices 123 comprises a rechargeable electrochemical cell. In one or more embodiments, the plurality of energy storage devices 123 include a pair of energy storage devices situated in each linkage member of the plurality of linkage members defining the deformable link assembly 101.

In one or more embodiments, each pair of energy storage devices of the plurality of energy storage devices 123 situates in a corresponding linkage member on a one-to-one basis, with a pair of energy storage devices 123 situated within a corresponding linkage member. In other embodiments, a single energy storage device of the plurality of energy storage devices 123 situates in a corresponding linkage member on a one-to-one basis. In still other embodiments, only some of the linkage members of the plurality of linkage members defining the deformable link assembly 101 will house energy storage devices. Other configurations will be obvious to those of ordinary skill in the art having the benefit of this disclosure.

In the illustrative embodiment of FIG. 1, the plurality of energy storage devices 123 are situated on a rear side of the flexible substrate supporting the display 102. In this example, the plurality of energy storage devices 123 are situated between the electronic circuit component housing 106 to other components situated within another electronic circuit component housing 127. In one or more embodiments, each pair of energy storage devices of the plurality of energy storage devices 123 substantially spans a width of the deformable electronic device.

Each energy storage device of the plurality of energy storage devices 123 can take a variety of forms. In an illustrative embodiment, each energy storage device of the plurality of energy storage devices 123 can comprise an electrochemical cell, which is optionally rechargeable. For instance, the plurality of energy storage devices 123 can each comprise a lithium-ion, lithium-polymer, or other type of rechargeable cell. Other examples of energy storage devices suitable for use with embodiments of the disclosure will be obvious to those of ordinary skill in the art having the benefit of this disclosure. For instance, in other embodiments the plurality of energy storage devices 123 may be a supercapacitor, and so forth.

In one or more embodiments, a first pair of energy storage devices is situated in a first linkage member, with a second pair of energy storages device situated in a second linkage member, and so forth. In one or more embodiments, an electrical conductor couples the energy storage devices of the plurality of energy storage devices 123 together and/or to the one or more processors 112.

Charging circuitry 124 can be included to selectively individual, subsets, or all of the plurality of energy storage devices 123 when depleted. In one or more embodiments, the charging circuitry 124 comprises a charging node that is coupled to each energy storage device of the plurality of energy storage devices 123.

In one or more embodiments, the charging circuitry 124 includes a switch that is electrically coupled between the conductor coupling the plurality of energy storage devices 123. Opening the switch disconnects the conductor from the plurality of energy storage devices 123, while closing the switch couples the plurality of energy storage devices 123 to the components of the block diagram schematic 110.

It is to be understood that FIG. 1 is provided for illustrative purposes only and for illustrating components of one deformable electronic device 100 in accordance with embodiments of the disclosure and is not intended to be a complete schematic diagram of the various components required for an electronic device. Therefore, other deformable electronic devices in accordance with embodiments of the disclosure may include various other components not shown in FIG. 1 or may include a combination of two or more components or a division of a particular component into two or more separate components, and still be within the scope of the present disclosure.

A user can perform a bending operation upon the deformable electronic device 100. For example, a user can apply force at the first end 108 and the second end 109 of the deformable electronic device 100 to pivot linkage members of the deformable link assembly 101 relative to other linkage members of the deformable link assembly 101. This method of deforming the deformable link assembly 101 allows the user to simply and quickly bend the deformable electronic device 100 into a desired geometric configuration. Examples of common geometric configurations include an L geometric configuration, a tent geometric configuration, a hook geometric configuration, and a wrapped geometric configuration. Others will be obvious to those of ordinary skill in the art having the benefit of this disclosure.

In other embodiments, rather than relying upon the manual application of force, the deformable electronic device 100 can include a mechanical actuator to deform the deformable link assembly 101 around the pivot members 103 of each linkage member. For example, a motor or other mechanical actuator can be operable with structural components to deform the deformable link assembly 101 around the pivot members 103 of the linkage members to predetermined angles or geometric alignments in one or more embodiments. The inclusion of a mechanical actuator allows a precise bend angle to be repeatedly achieved without the user having to make adjustments in attempting to achieve the same. However, as the inclusion of a mechanical actuator can increase cost, in other embodiments this component will be omitted.

It should be noted that in one or more embodiments, the display 102 has a compliance coefficient that can be used advantageously to help counter the bending operation. Illustrating by example, when the bending operation transforms the deformable electronic device 100 to a bent configuration, one example of which is shown below with reference to FIG. 3, in one or more embodiments the mechanical layers of the display 102 are loaded by the bending operation and work to bias portions of the deformable link assembly 101 back to the open position of FIG. 1.

Moreover, in one or more embodiments a thin stainless-steel plate (approximately 0.04 millimeters in thickness) forms one layer of the display 102 and will increase the loading. This mechanical loading of the layers of the display 102 can be used to help the user transform the deformable electronic device 100 from folded or partially folded configurations to unfolded configurations in one or more embodiments. The modulus of the display 102 can range from 40-300 giga-Pascals in one or more embodiments.

Regardless of whether the bending operation is a manual one or is instead one performed by a mechanical actuator, it results in the display 102 being deformed by one or more bends about the linkage members. Turning now to FIGS. 2-7, illustrated therein are three illustrative results of bending operations.

Figures 2, 3, 4:
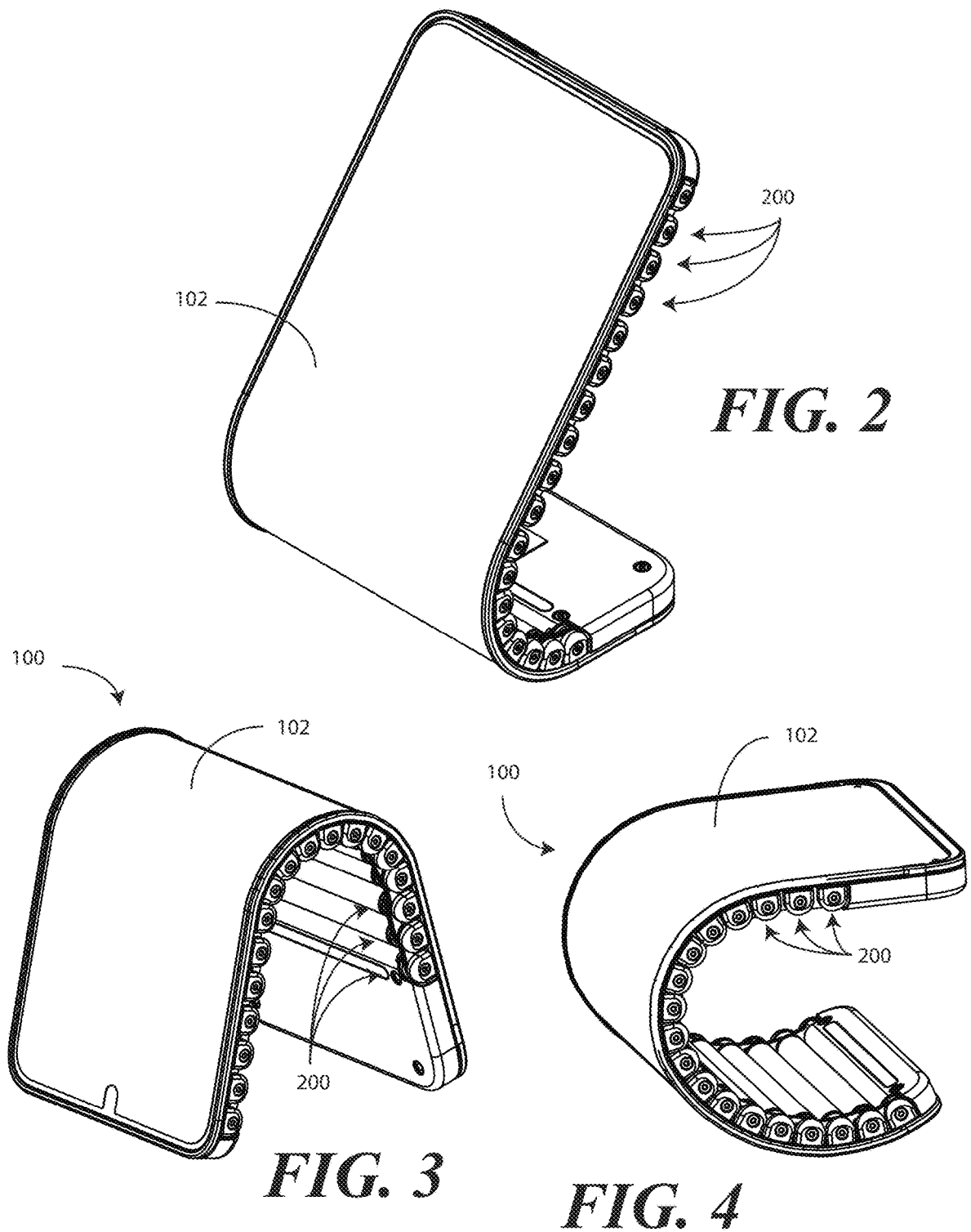
FIG. 2 illustrates one explanatory deformable electronic device in accordance with one or more embodiments of the disclosure when in a deformed to a "L stand" geometric configuration.
FIG. 3 illustrates one explanatory deformable electronic device in accordance with one or more embodiments of the disclosure when in a deformed to a "tent pad" geometric configuration.
FIG. 4 illustrates one explanatory deformable electronic device in accordance with one or more embodiments of the disclosure when in a deformed to a "wrap" geometric configuration.
Figure 5:
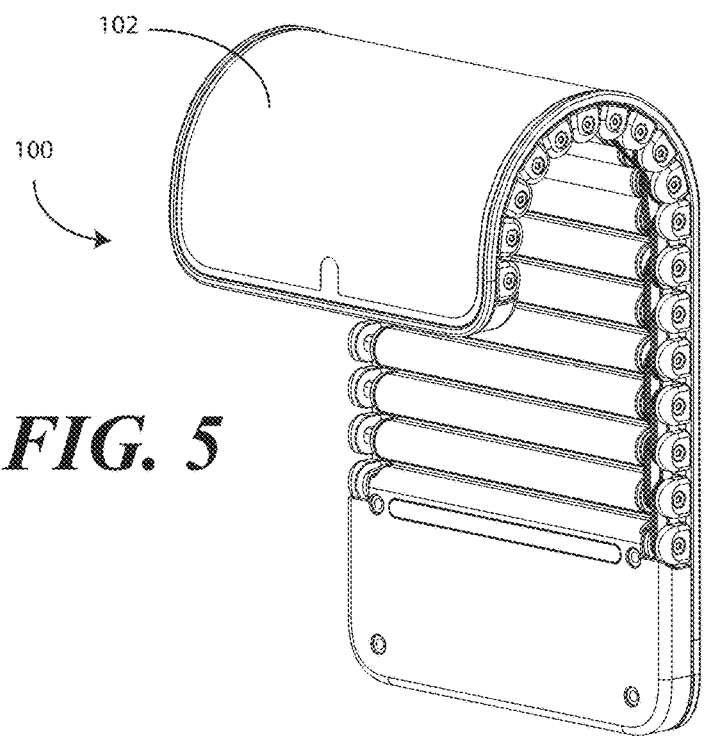
FIG. 5 illustrates one explanatory deformable electronic device in accordance with one or more embodiments of the disclosure when in a deformed to a "hook" geometric configuration.

In the illustrative embodiment of FIG. 2, the deformable electronic device 100 has been deformed into an L-shape geometric configuration. Additionally, the L-shape geometric configuration has been placed on a table or other flat surface such that the minor planar surface of display 102 defining the "L" abuts the surface. This is known as a "L stand" geometric configuration, with the deformable electronic device 100 having a single bend. This bent configuration can make the display 102 easier for the user to view since they do not have to hold the deformable electronic device 100 in their hands.

In this illustrative embodiment, the display 102 has a single bend about the linkage members 200. However, in other embodiments, the display 102 can be deformed with a plurality of bends about the linkage members 200. Other configurations will be obvious to those of ordinary skill in the art having the benefit of this disclosure.

In one embodiment, the one or more processors (112) of the deformable electronic device 100 are operable to detect that a bending operation is occurring from signals from the magnetometers of the magnet magnetometer pairs (120). Said differently, in one or more embodiments the one or more processors (112) are configured to determine whether the deformable electronic device 100 is deformed, and into what geometric configuration, from signals from the magnetometers of the magnet magnetometer pairs (120). This can be done in conjunction with other signals from the accelerometers (125).

Figure 6:
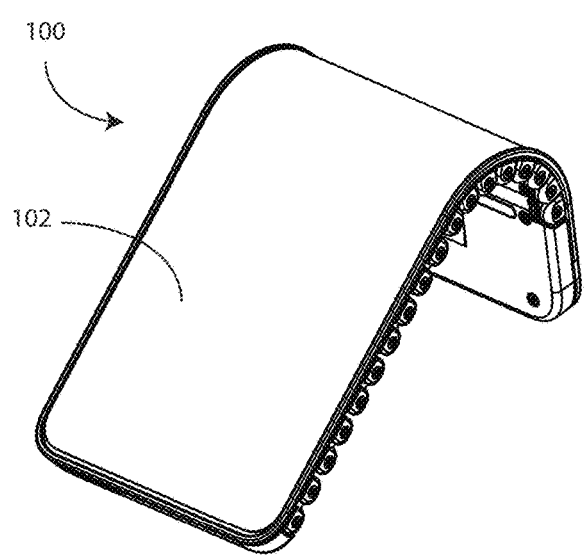
FIG. 6 illustrates one explanatory deformable electronic device in accordance with one or more embodiments of the disclosure when in a deformed to a "L pad" geometric configuration.
Figure 7:
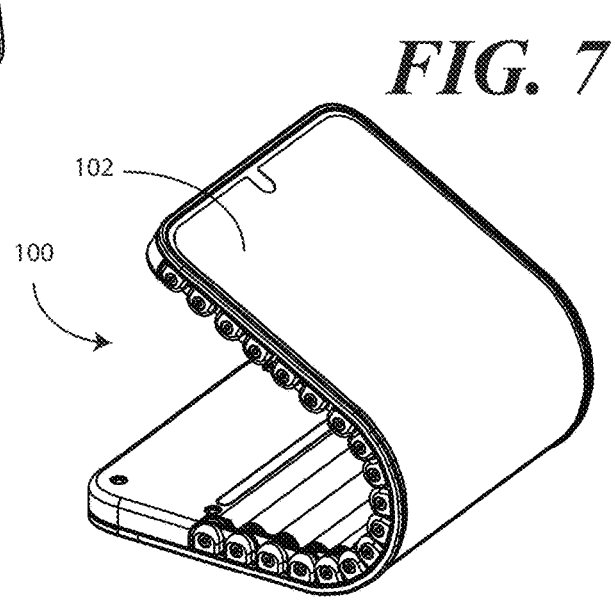
FIG. 7 illustrates one explanatory deformable electronic device in accordance with one or more embodiments of the disclosure when in a deformed to a "tent lean back" geometric configuration.

Where, for instance, the deformable electronic device 100 comprises a first accelerometer situated to one side of the plurality of linkage members and a second accelerometer situated to a second side of the plurality of linkage members, the one or more processors (112) are configured to determine, when the deformable electronic device 100 is deformed as shown in FIG. 2, whether the deformable electronic device 100 is in a pad orientation (the deformable electronic device 100 is shown in a L pad geometric configuration in FIG. 6), a stand orientation, or, in the case of tent folds such as that shown in FIG. 3, whether the deformable electronic device 100 is in a tent pad orientation (shown in FIG. 3) or a tent lean back orientation (the deformable electronic device 100 is shown in a tent lean back geometric configuration in FIG. 7). Techniques for doing this are further described below with reference to FIG. 18.

In FIG. 2, the one or more processors (112) are operable to determine the deformable electronic device 100 is in a L stand configuration from signals from the magnet magnetometer pair (120) and other signals from the accelerometers (125). The one or more processors (112) can detect other geometric configurations of the deformable electronic device 100 as well, one example of which is the hook geometric configuration shown in FIG. 5.

In one or more embodiments, the one or more processors (112) can partition the display 102 of the deformable electronic device 100 as another function of the geometric alignment of the deformable link assembly (101) resulting from the bending operation. For example, in the illustrative embodiment of FIG. 2 the display 102 has been partitioned into a first portion that is visible and a second portion (facing into the surface upon which the deformable electronic device 100 rests), with each portion being disposed on opposite sides of the stand bend. In one or more embodiments, the one or more processors (112) can detect a bend amount as well using the magnet magnetometer pairs (120) and/or accelerometers (125).

In one or more embodiments, the one or more processors (112) of the electronic device are operable to, when the display 102 is deformed by one or more bends, present a first image on a first portion of the display 102, while presenting a second image on a second portion of the display 102. If, for example, the deformable electronic device 100 were turned such that the first end (108) and the second end (109) were resting on the surface, which is known as a "pad" orientation, and which is shown in FIG. 6, the deformable electronic device 100 would resemble an offset tent with a first portion of the display 102 visible from a first side of the bend and a second portion of the display 102 visible from a second side of the bend.

When the bend is made in the middle, rather than in an offset location such as that shown in FIG. 2, the L geometric configuration transforms to a "tent" geometric configuration. One example of such a tent geometric configuration is shown in FIG. 3. As shown in FIG. 3, the deformable electronic device 100 has been bent further to resemble a playing card bent into a "tent" configuration. The tent configuration of FIG. 3 is in a "pad" orientation because the first end (108) and the second end (109) of the deformable electronic device 100 are resting on a surface. This "tent pad" geometric configuration makes the display 102 easier to see from above.

FIG. 4 illustrates the deformable electronic device 100 when deformed into a "wrapped" geometric configuration. When in the wrapped geometric configuration, the deformable electronic device 100 can even be worn on a wrist. When worn on a wrist, the wrapped geometric configuration becomes a wrist-worn wrapped geometric configuration. Whether the electronic device 100 is positioned on a wrist can be determined with touch sensors situated along the deformable housing.

In one or more embodiments, the wrapped geometric configuration can be configured with different radii to accommodate different size wrists. In one or more embodiments, the deformable electronic device 100 can be deformed into at least six different wrapped geometric configurations, each having a smaller radius than the one before to accommodate smaller and smaller wrists.

In one or more embodiments, the plurality of linkage members 200 define a multi-link hinging mechanism for the deformable electronic device 100. In FIGS. 1-7 the linkage members 200 are all similarly configured with links separating each pivot member (103) from another. The linkage members 200 defining the deformable link assembly 101 are attached to a rear major face of the flexible substrate supporting the display 102.

Figure 8:
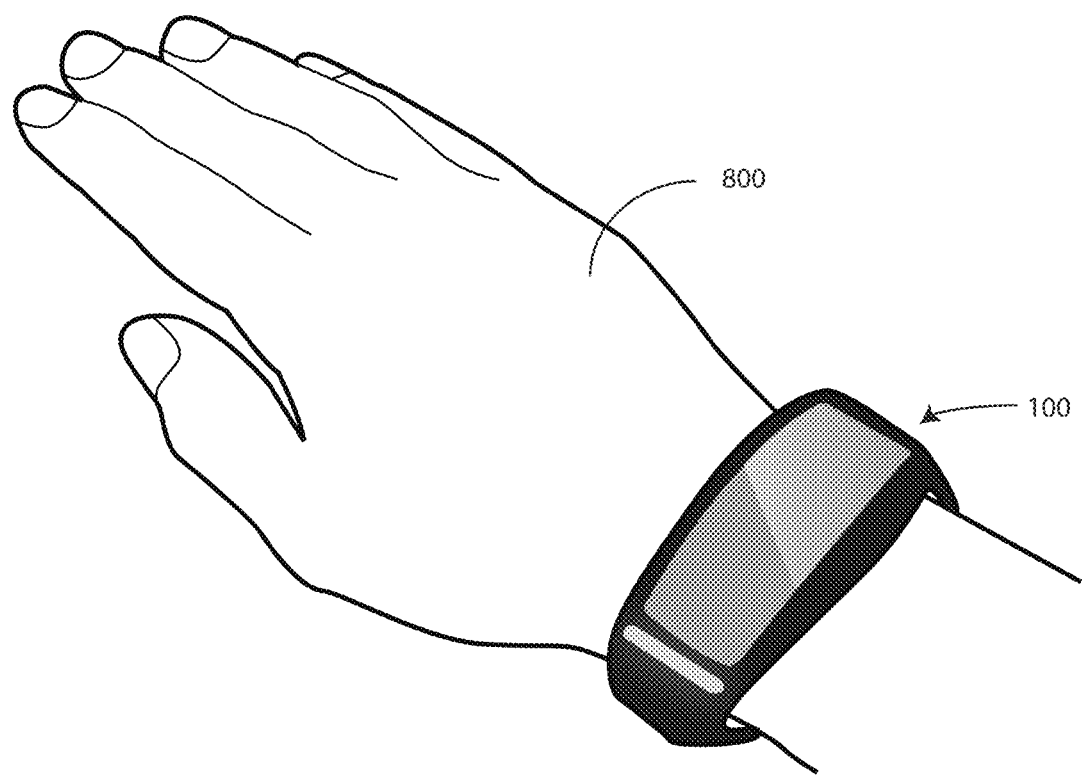
FIG. 8 illustrates one explanatory electronic device in accordance with one or more embodiments of the disclosure in a wrapped geometric form factor while being worn on the wrist of a user.

Turning now to FIG. 8, illustrated therein is a user, identified as user 800, wearing an explanatory electronic device 100 configured in accordance with one or more embodiments of the disclosure on their wrist while in a wrapped geometric form factor. The electronic device 100 is shown in a wrapped geometric configuration, specifically designed to be worn comfortably on the user's wrist. This configuration allows the electronic device 100 to adapt to the shape of the wrist, providing a secure and ergonomic fit.

To detect the wrist-worn wrapped geometric configuration, the electronic device 100 is equipped with one or more sensors. These sensors are strategically placed within the device to capture and analyze data related to the device's position and orientation. By monitoring the data from these sensors, one or more processors (112) of the electronic device 100 can determine if it is being worn on the user's wrist in the intended wrapped configuration.

One way the sensors can detect the wrist-worn wrapped geometric configuration is by utilizing magnet magnetometer pairs (120). These pairs of sensors can measure the magnetic field strength and orientation, allowing the electronic device 100 to detect the specific arrangement of the device's components when wrapped around the wrist. By analyzing the magnetic field data, the electronic device 100 can confirm that it is in the desired wrapped configuration.

Additionally, other sensors (121) integrated into the electronic device 100 can contribute to detecting the wrist-worn wrapped geometric configuration. For example, accelerometers and gyroscopes can sense the device's movement and orientation in three-dimensional space. By analyzing the data from these sensors, the device can determine if it is in the appropriate position and orientation to be considered in the wrapped configuration on the user's wrist.

Overall, the combination of magnet-magnetometer pairs and other sensors allows the electronic device 100 to accurately detect and confirm the wrist-worn wrapped geometric configuration. This ensures that the device enters the desired mode of operation, such as modes that automatically move content in response to gesture input translating the electronic device 100 in three-dimensional space are actuated when it is securely and comfortably worn on the user's wrist.

Figure 9:
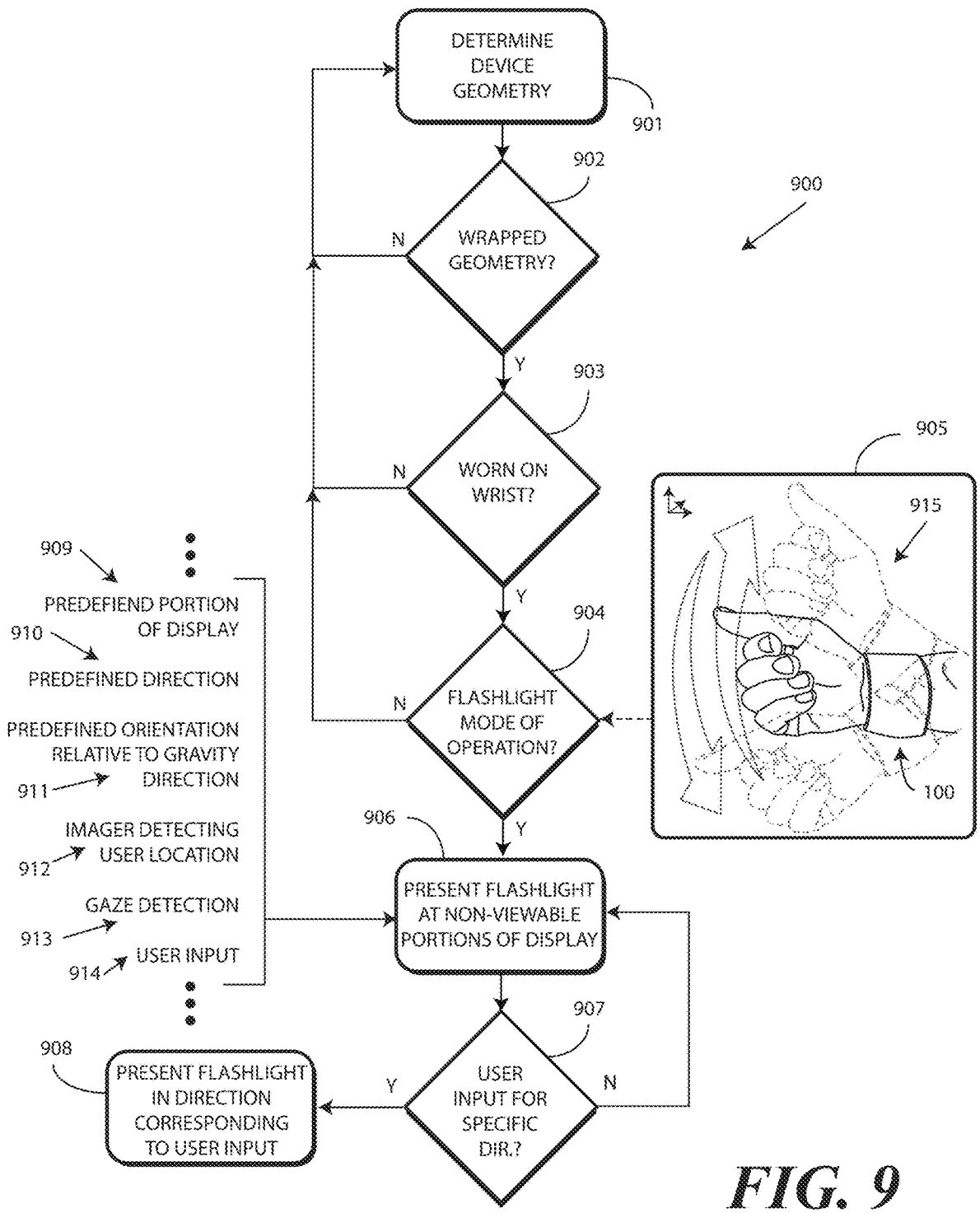
FIG. 9 illustrates one explanatory method in accordance with one or more embodiments of the disclosure.

Turning now to FIG. 9, illustrated therein is one explanatory method 900 in accordance with one or more embodiments of the disclosure. As described below, in one or more embodiments the method 900 detects, with at least a first sensor, a deformable device housing of the electronic device being transitioned to a wrapped geometry about a wrist. In one or more embodiments, the method 900 detects, with at least a second sensor, a rotational and/or lifting operation of the electronic device in three-dimensional space.

Thereafter, in response to the at least a first sensor detecting the wrapped geometry about the wrist and the at least a second sensor detecting the rotational and/or lifting operation, the method 900 causes, with one or more processors, flashlight output presented on a flexible display supported by the deformable device housing to move in proportion to the rotational and/or lifting operation. In one or more embodiments, an outward facing vector extending distally from the flashlight output is oriented in a constant direction during the rotational and/or lifting operation.

Embodiments of the disclosure contemplate that in most use cases a user will want the direction of the flashlight output to remain unchanged while an arm moves with the electronic device in the wrist-worn, wrapped geometric form factor. As such, if the flashlight output is initially projected downward and in front of a user, the vector central to this projection remains substantially constant in three-dimensional space while the electronic device transitions as the user's arm moves in three-dimensional space. Embodiments of the disclosure contemplate that when the electronic device is in the wrist-worn, wrapped geometric form factor, a user can move their arm with flashlight output being continuously directed in an initial direction so that their arm has free movement without the flashlight output shining in their eyes, at a friend named Buster, or in other unwanted directions.

Beginning at step 901, one or more sensors of the electronic device detect a geometric form factor of an electronic device having a deformable device housing. Decision 902 then determines whether the geometric form factor is deformed to a wrapped geometric form factor. Where it is, decision 903 determines whether the electronic device is worn on a wrist. Where these conditions are true, the method 900 proceeds to decision 904. Otherwise, the method 900 returns to step 901.

Decision 904 determines whether a flashlight mode of operation has been initiated. This decision 904 determines that the device is ready to provide illumination when needed. Several techniques can be employed to put the electronic device into the flashlight mode of operation, each offering unique advantages to the user.

One technique involves using a specific gesture, such as the "chop chop" motion 915 of step 905. In one or more embodiments, a gesture input translating the electronic device 100 in a chopping motion in the three-dimensional space in a chopping motion while in the wrist-worn geometric form factor. In so doing, the user can shake the electronic device 100 up and down in a "chop chop" motion 915 at step 905, which is detected by decision 904. In one or more embodiments, when a "chop chop" motion of the electronic device 100 is detected by decision 904, at step 906 the one or more processors cause a light source of the electronic device to turn ON, i.e., start and continue emitting light.

Advantageously, this gesture-based control allows the user to quickly and intuitively activate the flashlight function by performing a simple motion with their wrist. The "chop chop" motion 915 involves moving the electronic device 100 up and down in a chopping motion, which is detected by the device's sensors at decision 904. The primary advantage of this technique is its ease of use and speed. Users can activate the flashlight without needing to navigate through menus or settings, making it particularly useful in situations where immediate illumination is required, such as in emergencies or low-light environments.

Another technique for entering the flashlight mode of operation is through voice commands. Modern electronic devices often come equipped with voice recognition capabilities, allowing users to activate the flashlight by simply speaking a command, such as "Turn on flashlight." This method is advantageous for users who may have their hands occupied or are unable to perform gestures. Voice commands provide a hands-free option, enhancing convenience and accessibility, especially for users with mobility impairments or those engaged in activities where manual activation is impractical.

Additionally, the electronic device 100 can be configured to enter the flashlight mode of operation through a dedicated hardware button. Some devices may include a physical button specifically designed for activating the flashlight. This button can be strategically placed on the device for easy access. The advantage of this technique is its reliability and tactile feedback. Users can quickly locate and press the button, even in complete darkness, ensuring that the flashlight function is activated without any delay. This method is particularly beneficial for users who prefer physical controls over touch or voice-based interactions.

Furthermore, the flashlight mode can be activated through a software interface, such as a quick settings menu or a dedicated app. Users can swipe down on the screen to access the quick settings menu and tap on the flashlight icon to turn it on. Alternatively, a dedicated flashlight app can provide additional features, such as adjustable brightness levels or strobe effects. The advantage of this technique is the flexibility and customization it offers. Users can easily access the flashlight function from the device's interface and tailor the settings to their specific needs, providing a more personalized user experience.

In summary, decision 904 of FIG. 9 ensures that the electronic device is in the flashlight mode of operation, ready to provide illumination. Techniques such as the "chop chop" motion 915, voice commands, dedicated hardware buttons, and software interfaces each offer unique advantages, enhancing the usability and accessibility of the flashlight function. These methods cater to different user preferences and scenarios, ensuring that the flashlight can be activated quickly and efficiently when needed At step 906, the method 900 initially presents flashlight output, optionally from a portion of a flexible display supported by a deformable housing of an electronic device in a default position. This default position is designed to allow the user to direct the flashlight output toward a desired target and away from their eyes. In one or more embodiments, the default position can be selected from a variety of options, each offering a unique location for the content presentation.

One option for the default location is the predefined portion of the display 909. This predefined portion is situated at a specific area of the flexible display, strategically chosen to likely cause the flashlight output to project away from the eyes of the user. By presenting the content in this predefined portion of the display 909, the electronic device 100 can provide a consistent and intuitive user experience when the electronic device 100 is operating in the flashlight mode of operation.

Another option for the default location is such that the content is visible from a predefined direction 910, while the flashlight output is directed in another direction, which will often be the opposite direction. In one or more embodiments, this predefined direction 910 determines the orientation of the flashlight output from the flexible display relative to a default expected orientation to a user. Illustrating by example, when the electronic device 100 is worn like a watch, the predefined direction 910 can be downward and away from the ulna bone of the wearer. By aligning the flashlight output with a predefined direction 910, the electronic device 100 can ensure that the user can easily interact with and consume any displayed information without the flashlight output shining in their eyes.

A further option for the default location is the predefined orientation relative to gravity direction 911. This predefined orientation takes into account the gravitational forces acting on the electronic device 100. By aligning the content presentation so as to have a predefined relationship with the direction of gravity as it intersects the electronic device 100, the electronic device 100 can provide a natural and comfortable flashlight mode of operation experience for the user.

Element 912 represents the option of utilizing an imager to detect the user's location. By using an image capture device, the electronic device can determine the position and orientation of the user, allowing for a personalized and tailored flashlight output away from the user's eyes an in a direction likely to illuminate objects in front of the user.

Element 913 represents the option of gaze detection. By detecting the direction of the user's gaze, the electronic device 100 can adjust the flashlight output so that it never is directed toward the user's eyes but is instead directed away from the eyes in alignment with the user's line of sight. This ensures that the user can easily view and interact with objects before them in dark environs without temporarily blinding their eyes or adjusting their posture.

Finally, element 914 represents the option of user input. By allowing the user to provide input, such as through gestures or commands, the electronic device can customize the default location of the flashlight output based on the user's preferences and needs.

In summary, step 906 of FIG. 9 involves initially presenting flashlight output from a flexible display supported by a deformable housing of an electronic device 100 in a default position. This default position can be selected from various options, including predefined portions of the display, predefined directions, predefined orientations relative to gravity, user location detection, gaze detection, and user input. Each option offers a unique way to optimize the flashlight output presentation and enhance the user experience.

At decision 907, the method 900 involves determining whether user input is received by the electronic device 100 redirecting the flashlight output initially presented in the default direction at step 906 in a different direction. This decision 907 allows the device to adapt to the user's needs and preferences in real-time. Users may want to redirect the flashlight output for various reasons, such as to illuminate a specific area, avoid reflective glare, or enhance visibility in different environments. Several methods can be employed to redirect the flashlight output, each offering unique advantages.

One way a user can redirect the flashlight output is through gesture-based controls. For instance, the user can perform a specific motion, such as tilting or rotating their wrist, to change the direction of the flashlight output. This method is highly intuitive and allows for quick adjustments without the need to interact with the device's interface. The primary advantage of gesture-based controls is their ease of use and immediacy, making them ideal for situations where the user needs to adjust the flashlight direction rapidly, such as when navigating in the dark or when their hands are occupied.

Another method for redirecting the flashlight output is through voice commands. Users can simply speak a command, such as "Turn flashlight left" or "Point flashlight down," to change the direction of the light. This hands-free approach is particularly beneficial for users who may have their hands full or are unable to perform gestures. Voice commands offer a high level of convenience and accessibility, especially for users with mobility impairments or those engaged in activities where manual adjustments are impractical.

Additionally, the electronic device 100 can include a touch interface that allows users to manually adjust the direction of the flashlight output. For example, users can swipe or tap on the screen to move the light beam to the desired location. This method provides precise control over the flashlight direction and can be particularly useful in scenarios where accuracy is essential, such as when inspecting small objects or reading in low light. The advantage of a touch interface is its precision and the ability to make fine adjustments, ensuring that the flashlight output is directed exactly where it is needed.

Furthermore, the electronic device 100 can be equipped with an image capture device that tracks the user's gaze. By detecting the direction of the user's gaze, the electronic device 100 can automatically adjust the flashlight output to follow the user's line of sight. This method offers a seamless and intuitive way to control the flashlight direction, enhancing the user experience by ensuring that the light is always directed where the user is looking. The primary advantage of gaze tracking is its ability to provide a hands-free and highly responsive control mechanism, making it ideal for dynamic environments where the user's focus may shift frequently.

In summary, decision 907 of FIG. 9 determines whether user input is received to redirect the flashlight output in a different direction. Users may want to redirect the flashlight output for various reasons, such as to illuminate specific areas or avoid glare. Methods such as gesture-based controls, voice commands, touch interfaces, and gaze tracking each offer unique advantages, enhancing the usability and flexibility of the flashlight function. These methods cater to different user preferences and scenarios, ensuring that the flashlight can be adjusted quickly and efficiently when needed.

Step 908 then redirects the flashlight output in response to the user input. This step ensures that the flashlight function adapts to the user's needs in real-time, providing effective illumination in the desired direction. By incorporating various input methods, the electronic device offers a versatile and user-friendly solution for managing the flashlight output, enhancing the overall user experience.

Embodiments of the disclosure contemplate that a user may want to move their arm in three-dimensional space while the electronic device is operating in a flashlight mode of operation without the flashlight output being redirected in response to that movement. Accordingly, in one or more embodiments one or more sensors of the electronic device 100 monitor the orientation of the electronic device 100 in three-dimensional space while operating in the flashlight mode of operation.

This monitoring allows one or more processors of the electronic device 100 to determine the position and movement of the device, which in turn affects the presentation of the flashlight output from the flexible display. There are several options available to accomplish this monitoring of orientation.

One option is to utilize one or more sensors, including those described above with reference to FIG. 1. These sensors can include accelerometers, gyroscopes, magnetometers, or a combination of these, which are capable of detecting changes in the device's position and orientation. By continuously monitoring the data from these sensors, the electronic device 100 can accurately track its orientation in three-dimensional space.

Another option is to incorporate one or more other sensors. These sensors can include proximity sensors, ambient light sensors, or any other suitable sensors that can provide additional information about the device's surroundings. By gathering data from these sensors, the electronic device 100 can further enhance its understanding of the user's environment and adjust the flashlight output presentation accordingly.

Additionally, the electronic device 100 can employ image capture devices to monitor the orientation. These image capture devices can include cameras or depth sensors that capture visual information about the device's surroundings. By analyzing the captured images or depth data, the electronic device can determine the orientation of the device relative to its surroundings.

Furthermore, the electronic device can utilize specialized components, such as inertial measurement units. Inertial measurement units combine multiple sensors, such as accelerometers, gyroscopes, and magnetometers, into a single integrated unit. This allows for more accurate and reliable monitoring of the device's orientation in three-dimensional space.

Figure 10:
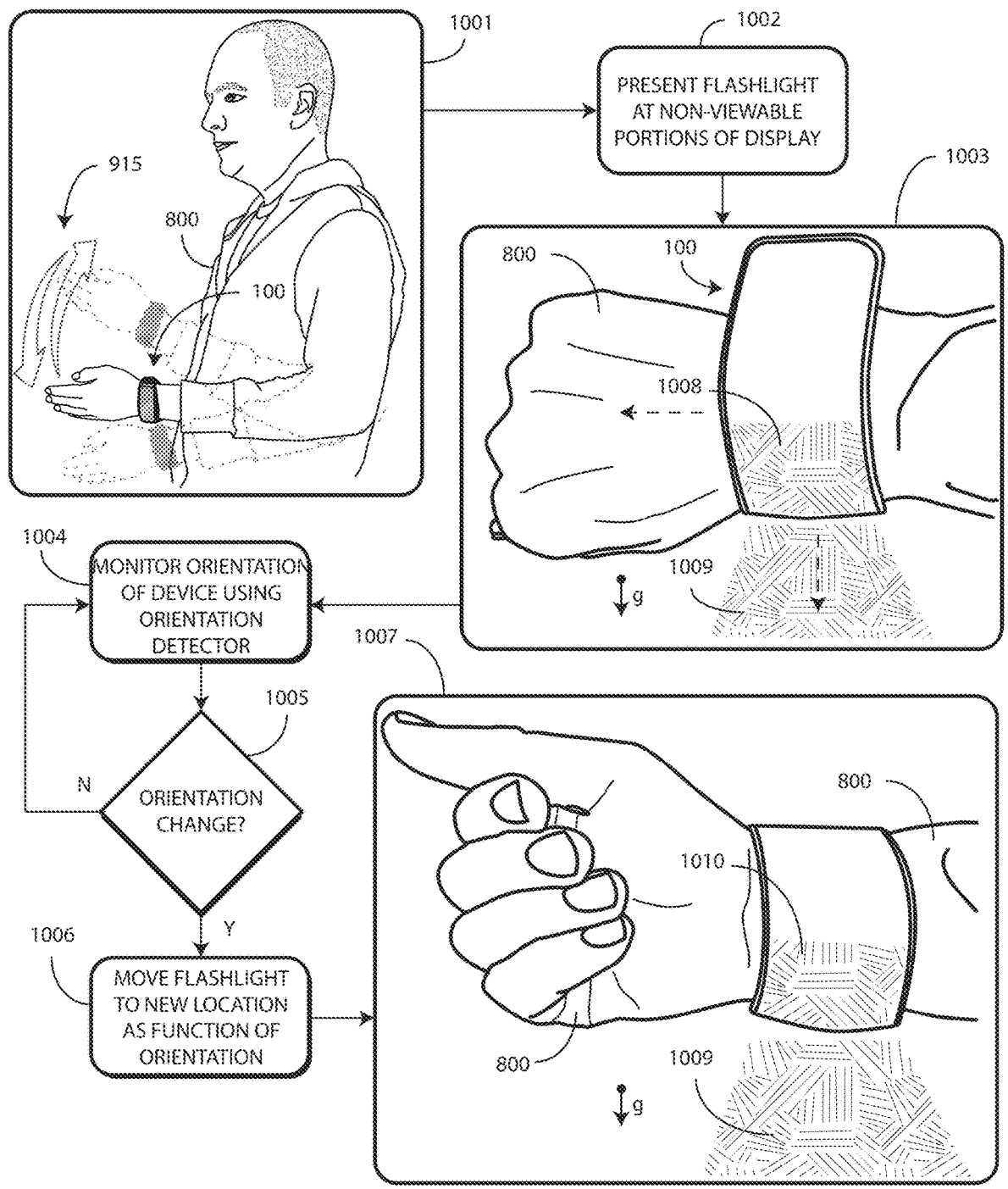
FIG. 10 illustrates another explanatory method in accordance with one or more embodiments of the disclosure.

Turning now to FIG. 10, illustrated therein are one or more method steps that involve monitoring the orientation of the electronic device 100 in three-dimensional space. This can be achieved through various options, including the use of sensors, other sensors, image capture devices, or specialized components like inertial measurement units. By continuously monitoring the device's orientation, the electronic device 100 can ensure precise and responsive adjustments to the flashlight output 1009 presentation from the flexible display, providing an optimal flashlight mode of operation experience for the user.

Beginning at step 1001, a user 800 is wearing an electronic device 100 configured in accordance with one or more embodiments of the disclosure. At step 1001, the one or more sensors determine that the wrist-worn, wrapped geometric form factor of the electronic device 100 is occurring.

As previously described, the electronic device 100 comprises a deformable housing having a plurality of linkage members, a flexible display supported by the deformable housing, one or more sensors operable to determine the wrist-worn, wrapped geometric form factor of the electronic device 100, and one or more sensors operable to detect when the electronic device 100 changes orientation in three-dimensional space. In one or more embodiments, the electronic device 100 also includes an image capture device and one or more processors operable with the one or more sensors, the one or more other sensors, and the image capture device.

At step 1001, the user 800 initiates a flashlight mode of operation by moving the electronic device 100 in a chop chop motion 915. Step 1002 then causes the flashlight output 1009 to emanate from the flexible display of the electronic device 100. Said differently, in one or more embodiments step 1102 comprises presenting, with one or more processors of the electronic device 100, flashlight output 1009 from the flexible display.

As shown at step 1003, in one or more embodiments the flashlight output 1009 is presented from the flexible display of the electronic device in a first location 1008. As described above with reference to FIG. 9, in one or more embodiments this first location 1008 is a default location that can be preset by the manufacturer, defined by a user, or selected by other techniques.

Thus, at step 1003 one or more processors of the electronic device 100 present flashlight output from the flexible display of the electronic device 100 in a first location 1008. In one or more embodiments, the first location 1008 is a default location situated at a predefined portion of the flexible display. In one or more embodiments, the first location 1008 is a default location situated at a predefined portion of the flexible display.

As described above with reference to FIG. 9, the default location can be selected in a variety of ways so that the electronic device 100 can be customized by the user 800. An example of this is shown at step 1003, where flashlight output 1009 is being presented from a first location 1008 of the flexible display of the electronic device 100. In other embodiments, an image capture device can detect a gaze cone of the user 800 to ensure the first location 1008 is situated outside the gaze cone. In this illustrative embodiment.

In this illustrative example the first location 1008 has been selected by a probable visible location (the top of the electronic device 100) for a presentation of content relative to a gaze of the user 800. As such, the first location 1008 is outside the probable visible location and is situated at another portion of the flexible display. What's more, as shown at step 1003 the first location 1008 spans a portion of the flexible display where a direction of gravity exits a surface (at the bottom of the electronic device 100) of the flexible display. Additionally, as shown at step 1003, the first location 1008 of the flexible display occupies less than half of the flexible display.

Step 1004 then monitors for the orientation of the electronic device 100 changing using an orientation detector. In one or more embodiments, when the user 800 delivers gesture input to the electronic device 100, such as by performing a lifting operation elevating the electronic device 100 from a first position to a second position in three-dimensional space. In the illustrative embodiment of FIG. 10, the user 800 changes in the orientation of the electronic device 100 with a rotation about a central axis of the wrapped, wrist-worn geometric configuration, which is shown as a dashed line at step 1003.

Decision 1005 detects whether gesture input has moved the electronic device 100 in three-dimensional space while the wrapped geometric form factor is occurring. In one or more embodiments, decision 1005 detects whether a rotational and/or lifting operation has changed the orientation in the three-dimensional space.

By comparing step 1003 with step 1007, it can be seen that the user 800 in this illustrative example has rotated their wrist from having the radius bone and thumb oriented downward at step 1003 to having the ulna bone oriented downward and thumb oriented upward at step 1007. At step 1006 one or more processors of the electronic device 100 move the flashlight output on the flexible display in response to the orientation to a second location 1010 as a function of a change in orientation of the electronic device 100 in three-dimensional space resulting from the rotation.

In this illustrative embodiment, the second location 1010 spans another portion of the flexible display where the direction of gravity exits another surface (the bottom of step 1007, which was the top of step 1003) of another portion of the flexible display. This results in the second location 1010 being situated upon an ulna bone of the user 800, with the flashlight output 1009 being directed downward and away from the user's eyes.

Advantageously, the one or more method steps of FIG. 10 detect a deformable housing of the electronic device 100 being transitioned to a wrapped geometry around a wrist, with the result being shown at step 1001. The method steps comprise detecting, with another sensor at step 1004 and decision 1005, a rotational operation of the electronic device 100 in three-dimensional space. In response to the at least a first sensor detecting the wrapped geometry about the wrist and the at least a second sensor detecting the rotational operation, one or more processors of the electronic device 100 cause the flashlight output 1009 presented by the flexible display supported by the deformable housing to move in proportion to the rotational operation. In this illustrative embodiment, an outward facing vector extending distally from the flashlight output 1009, shown at step 1003, remains in a constant orientation when the flashlight output 1009 is moved to the second location 1010 at step 1007.

By detecting, with at least a first sensor, a deformable device housing of the electronic device 100 being transitioned to a wrapped geometry about a wrist, the system can accurately determine when the device is in a specific form factor that is conducive to wearable use. This ensures that the device can adapt its functionality appropriately based on its physical configuration, enhancing user experience and device versatility.

Detecting, with at least a second sensor, a rotational and/or lifting operation of the electronic device 100 in three-dimensional space allows the system to monitor the orientation and movement of the device in real-time. This capability ensures that the device can respond dynamically to user actions, providing a more intuitive and responsive interaction.

In response to the at least a first sensor detecting the wrapped geometry about the wrist and the at least a second sensor detecting the rotational and/or lifting operation, causing, with one or more processors, flashlight output 1009 presented on a flexible display supported by the deformable device housing to move in proportion to the rotational and/or lifting operation ensures that the flashlight output 1009 remains directed away from the user's eyes and towards the area that needs illumination. This automatic adjustment prevents glare and enhances user comfort, particularly in scenarios where the user is moving or needs to frequently check the device while using the flashlight function.

Maintaining an outward facing vector extending distally from the flashlight output oriented in a constant direction during the rotational and/or lifting operation ensures that the flashlight beam remains stable and directed towards the intended area, regardless of the user's wrist movements. This stability is providing effective illumination and user safety, as it prevents the light from inadvertently shining into the user's eyes or other unintended directions.

Embodiments of the disclosure advantageously allow a user to elegantly maintain an initial projection direction of flashlight output 1009 from the flexible display without having to rely upon physical keys, and without having to awkwardly drag the flashlight output 1009 around a deformed electronic device. Importantly, the method prevents the flashlight output 1009 from being directed toward the eyes of a user or their friend, Buster. The gesture-based translation of flashlight output 1009 allows for a more natural and "easy to learn" capability for the system.

Figure 11:
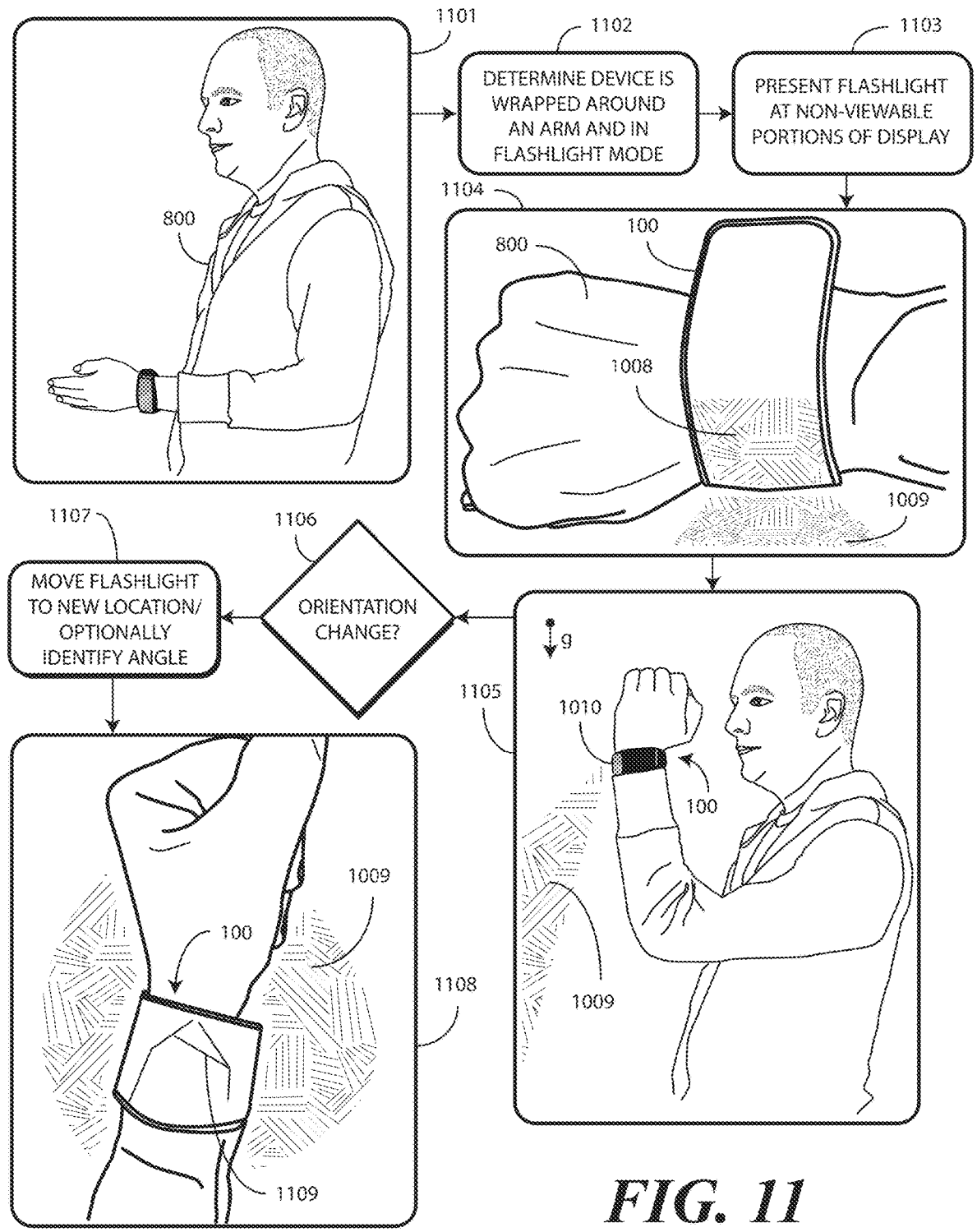
FIG. 11 illustrates still another explanatory method in accordance with one or more embodiments of the disclosure.

Turning now to FIG. 11, illustrated therein are one or more method steps illustrating how embodiments of the disclosure can be used to control the flashlight output 1009 in response to translation, rather than the rotation occurring in FIG. 10. Beginning at step 1101, the user 800 is again wearing an electronic device 100 configured in accordance with one or more embodiments of the disclosure. At step 1102, the one or more sensors determine that the wrist-worn, wrapped geometric form factor of the electronic device 100 is occurring. In this illustrative example, the one or more sensors determine that the wrist-worn, wrapped geometric form factor of the electronic device 100 is occurring while the electronic device 100 is operating in a flashlight mode of operation.

At step 1103, the one or more processors of the electronic device 100 present flashlight output 1009 from at a first location 1008 on the flexible display of the electronic device 100. An illustration of this flashlight output 1009 is shown emanating from the first location 1008 of the electronic device 100 situated along the radius bone of the user 800 at step 1004.

Desiring to get a better view of his dog, Henry, who is barking at something in the dark, at step 1105 the user 800 transitions the electronic device 100 in three-dimensional space toward a vertical position where the direction of gravity fails to intersect a major surface of the flexible display. As shown at step 1105, this position where the direction of gravity passes through a central axis of the wrapped geometric form factor resembles a camcorder support condition that might exist if the user 800 were holding a camcorder. This gesture input is detected at decision 1106.

In this illustrative embodiment, the lifting operation has moved the electronic device 100 to a position where a gravity direction passes through a loop defined by the wrapped geometric form factor, and as shown at step 1105, through a width of the electronic device. This means the direction of gravity fails to intersect a major surface of the flexible display, and instead passes substantially through its width.

At decision 1106, one or more sensors of the electronic device 100 detect this gesture input indicating that the electronic device 100 is being transitioned in three-dimensional space by elevating the electronic device 100 from a first position to a second position in the three-dimensional space. As shown at step 1105, the gesture input has been a lifting operation moving the electronic device 100 to a position in the three-dimensional space where a gravity direction passes through a loop defined by the wrapped geometric form factor.

At step 1107, the one or more processors of the electronic device 100 move the flashlight output 1009 from the first location 1008 shown at step 1104 to a second location 1010 shown at step 1105. In this illustrative embodiment, the one or more processors have moved the flashlight output 1009 around the electronic device 100 by about ninety degrees such that the flashlight output 1009 is situated along the ulna bone of a wrist of the user 800, as shown at step 1105.

In one or more embodiments when the electronic device 100 is causing the flashlight output 1009 to be projected away from the user 800, step 1107 can also identify an angle of projection 1109 of the flashlight output 1009. Illustrating by example, as shown at step 1108 the angle of projection 1109 is being presented along with directional lines that indicate the direction in which the flashlight output 1009 is directed. By displaying these directional lines, the electronic device 100 provides the user 800 with a clear understanding of where the flashlight output 1009 is currently being directed. In one or more embodiments, the user 800 can deliver touch input to the directional lines to adjust the direction of projection of the flashlight output 1009. Advantageously, the method of FIG. 11 allows for an intuitive and seamless method to transition their hand and forearm in three-dimensional without losing sight of output of a flashlight mode of operation.

Figure 12:
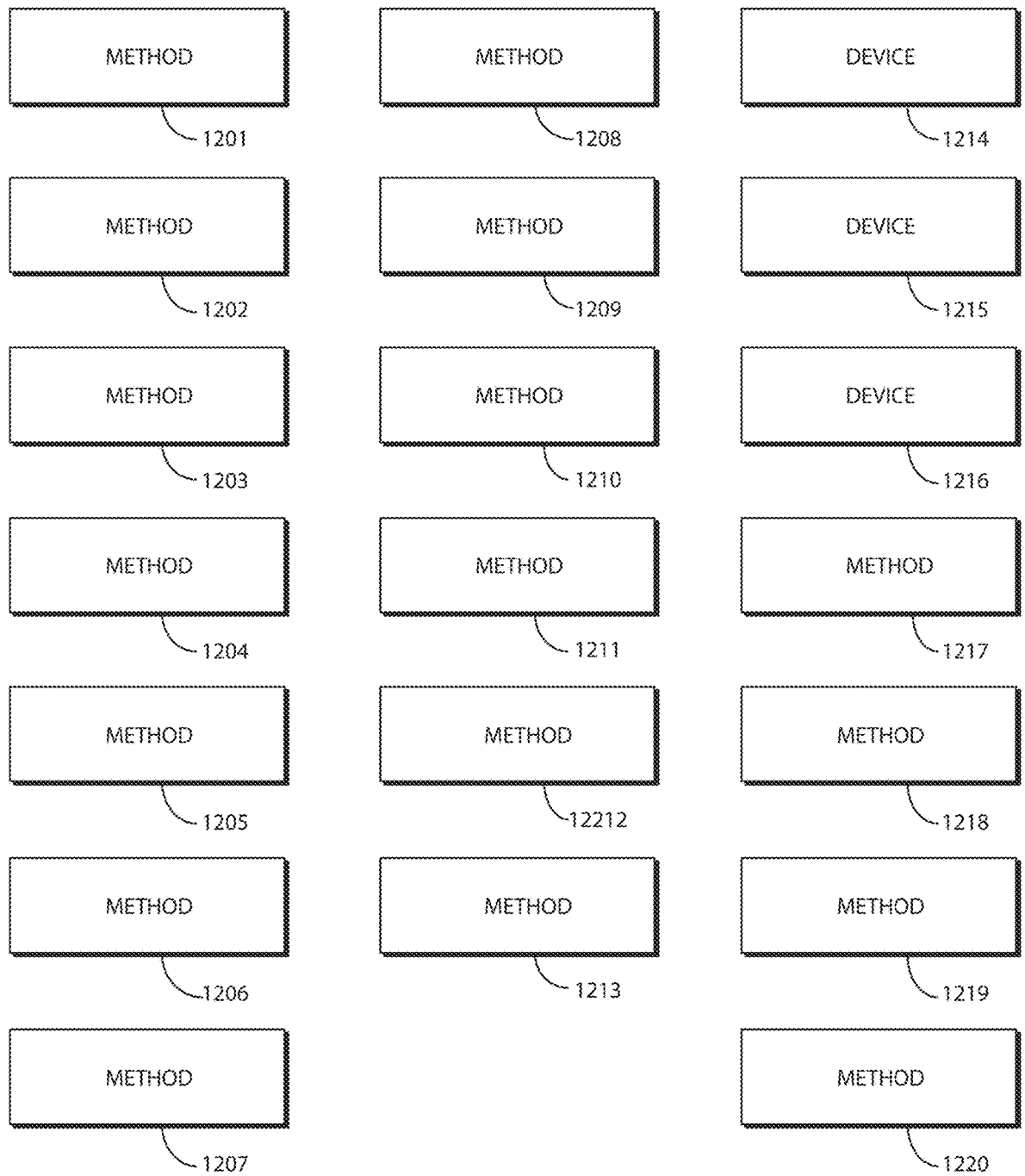
FIG. 12 illustrates various embodiments of the disclosure.

Turning now to FIG. 12, illustrated therein are various embodiments of the disclosure. The embodiments of FIG. 12 are shown as labeled boxes in FIG. 12 due to the fact that the individual components of these embodiments have been illustrated in detail in FIGS. 1-11, which precede FIG. 12. Accordingly, since these items have previously been illustrated and described, their repeated illustration is no longer essential for a proper understanding of these embodiments. Thus, the embodiments are shown as labeled boxes.

At 1201, a method in an electronic device comprises detecting, with one or more sensors, a wrapped geometric form factor defined by a flexible display supported by a deformable housing while in a flashlight mode of operation. At 1201, the method comprises presenting, with one or more processors, flashlight output on the flexible display in a first location.

At 1201, the method comprises also detecting, with one or more other sensors, gesture input translating the electronic device in three-dimensional space while the wrapped geometric form factor is occurring. At 1201, the method comprises moving, by the one or more processors, the flashlight output on the flexible display in response to the translating to a second location as a function of a change in orientation of the electronic device in three-dimensional space resulting from the translating.

At 1202, the first location of 1201 is a default location situated at a predefined portion of the flexible display. At 1203, the method of 1202 further comprises estimating a probable visible location for the content relative to a gaze of a wearer of the electronic device. At 1203, the second location is outside the probable visible location situated at another portion of the flexible display.

At 1204, the method of 1201 further comprises detecting, using an image capture device, a gaze cone of a wearer of the electronic device. At 1204, the first location is situated outside the gaze cone.

At 1205, the first location of 1201 spans at a portion of the flexible display where a direction of gravity exits a surface of the portion of the flexible display. At 1206, the second location of 1205 spans another portion of the flexible display where the direction of gravity exits another surface of another portion of the flexible display.

At 1207, the direction of gravity of 1205 fails to intersect a major surface of the flexible display after the translating. At 1208, the second location of 1207 is situated upon an ulna bone of the wrist of a wearer of the electronic device.

At 1209, the flashlight mode of operation of 1208 is initiated by translating the electronic device in a chop-chop motion in the three-dimensional space. At 1210, the first portion of the flexible display of 1209 occupies less than half of the flexible display.

At 1211, the method of 1201 further comprises identifying, with the one or more sensors, a wrist-worn condition of the wrapped geometric form factor. At 1211, the moving the flashlight output on the flexible display in response to the translating only when the wrist-worn condition is occurring.

At 1212, the gesture input of 1201 comprises a lifting operation elevating the electronic device from a first position to a second position in the three-dimensional space. At 1213, the gesture input of 1201 comprises a lifting operation moving the electronic device to a position in the three-dimensional space where a gravity direction passes through a loop defined by the wrapped geometric form factor.

At 1214, an electronic device comprises a deformable housing comprises a plurality of linkage members. At 1214, the electronic device comprises a flexible display supported by the deformable housing. At 1214, the electronic device comprises one or more sensors operable to determine a wrapped, wrist-worn geometric configuration of the electronic device and one or more other sensors operable to detect when the electronic device changes orientation in three-dimensional space.

At 1214, the electronic device comprises one or more processors operable with the one or more sensors and the one or more other sensors. At 1214, the one or more processors are operable to cause a flashlight output on the flexible display to move along the flexible display as a function of the changes in the orientation of the electronic device in the three-dimensional space while the electronic device is in the wrapped, wrist-worn geometric configuration.

At 1215, the electronic device of 1214 further comprises an image capture device operable to capture one or more images of an eye of a wearer of the electronic device to determine a first portion of the flexible display upon which a gaze of the wearer is directed. At 1216, the one or more processors of 1215 are further configured to cause the flexible display to present the flashlight output on a second portion of the flexible display that is different from the first portion.

At 1217, the electronic device of 1214 further comprises an image capture device operable to determine a direction of gaze from a wearer of the electronic device. At 1217, the one or more processors cause the content presentation to initially be presented outside the direction of gaze from the wearer. At 1218, the changes in the orientation of the electronic device of 1214 comprise a rotation about a central axis of the wrapped, wrist-worn geometric configuration.

At 1219, a method in an electronic device comprises detecting, with at least a first sensor, a deformable device housing of the electronic device being transitioned to a wrapped geometry about a wrist and detecting, with at least a second sensor, a rotational and/or lifting operation of the electronic device in three-dimensional space. At 1219, in response to the at least a first sensor detecting the wrapped geometry about the wrist and the at least a second sensor detecting the rotational and/or lifting operation, the method comprises causing, with one or more processors, flashlight output presented on a flexible display supported by the deformable device housing to move in proportion to the rotational and/or lifting operation. At 1220, an outward facing vector of the method of 1219 extends distally from the flashlight output oriented in a constant direction during the rotational and/or lifting operation.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   detecting, with one or more sensors, a wrapped geometric form factor defined by a flexible display supported by a deformable housing while in a flashlight mode of operation;
   presenting, with one or more processors, flashlight output on the flexible display in a first location;
   also detecting, with one or more other sensors, gesture input translating the electronic device in three-dimensional space while the wrapped geometric form factor is occurring;
   identifying, with the one or more sensors, a wrist-worn condition of the wrapped geometric form factor; and
   moving, by the one or more processors, the flashlight output on the flexible display in response to the translating to a second location as a function of a change in orientation of the electronic device in three-dimensional space resulting from the translating;
   wherein the moving the flashlight output on the flexible display in response to the translating occurs only when the wrist-worn condition is occurring.

2. The method of claim 1, wherein the first location is a default location situated at a predefined portion of the flexible display.

3. The method of claim 2, further comprising estimating a probable visible location for content relative to a gaze of a wearer of the electronic device, wherein the second location is outside the probable visible location situated at another portion of the flexible display.

4. The method of claim 1, further comprising detecting, using an image capture device, a gaze cone of a wearer of the electronic device, wherein the first location is situated outside the gaze cone.

5. The method of claim 1, wherein the first location spans at a portion of the flexible display where a direction of gravity exits a surface of the portion of the flexible display.

6. The method of claim 5, wherein the second location spans another portion of the flexible display where the direction of gravity exits another surface of another portion of the flexible display.

7. The method of claim 5, wherein the direction of gravity fails to intersect a major surface of the flexible display after the translating.

8. The method of claim 7, wherein the second location is situated upon an ulna bone of the wrist of a wearer of the electronic device.

9. The method of claim 8, wherein the flashlight mode of operation is initiated by translating the electronic device in a chop-chop motion in the three-dimensional space.

10. The method of claim 9, wherein the first location of the flexible display occupies less than half of the flexible display.

11. The method of claim 1, wherein ends of the deformable housing are separated while the electronic device when in the wrapped geometric form factor.

12. The method of claim 1, wherein the gesture input comprises a lifting operation elevating the electronic device from a first position to a second position in the three-dimensional space.

13. The method of claim 1, wherein the gesture input comprises a lifting operation moving the electronic device to a position in the three-dimensional space where a gravity direction passes through a loop defined by the wrapped geometric form factor.

14. An electronic device, comprising:
- a deformable housing comprises a plurality of linkage members;
- a flexible display supported by the deformable housing;
- one or more sensors operable to determine a wrapped, wrist-worn geometric configuration of the electronic device;
- one or more other sensors operable to detect when the electronic device changes orientation in three-dimensional space; and
- one or more processors operable with the one or more sensors and the one or more other sensors, the one or more processors operable to cause a flashlight output on the flexible display to move along the flexible display as a function of the changes in the orientation of the electronic device in the three-dimensional space while the electronic device is in the wrapped, wrist-worn geometric configuration;
- wherein the one or more processors are further configured to identify, with the one or more sensors, a wrist-worn condition of a wrapped geometric form factor;
- wherein movement of the flashlight output on the flexible display in response to translating the electronic device occurs only when the wrist-worn condition is occurring.

15. The electronic device of claim 14, further comprising an image capture device operable to capture one or more images of an eye of a wearer of the electronic device to determine a first portion of the flexible display upon which a gaze of the wearer is directed.

16. The electronic device of claim 15, the one or more processors further configured to cause the flexible display to present the flashlight output on a second portion of the flexible display that is different from the first portion.

17. The electronic device of claim 14, further comprising an image capture device operable to determine a direction of gaze from a wearer of the electronic device, wherein the one or more processors cause the content presentation to initially be presented outside the direction of gaze from the wearer.

18. The electronic device of claim 14, wherein the changes in the orientation of the electronic device comprise a rotation about a central axis of the wrapped, wrist-worn geometric configuration.

19. A method in an electronic device, the method comprising:
- detecting, with at least a first sensor, a deformable device housing of the electronic device being transitioned to a wrapped geometry about a wrist;
- detecting, with at least a second sensor, a rotational and/or lifting operation of the electronic device in three-dimensional space; and
- in response to the at least a first sensor detecting the wrapped geometry about the wrist and the at least a second sensor detecting the rotational and/or lifting operation, causing, with one or more processors, flashlight output presented on a flexible display supported by the deformable device housing to move in proportion to the rotational and/or lifting operation;
- wherein an outward facing vector extending distally from the flashlight output oriented in a constant direction during the rotational and/or lifting operation.

20. The method of claim 19, wherein the outward facing vector extending distally from the flashlight output remains directed away from eyes of a user during the rotational and/or lifting operation.

21. A method in an electronic device, the method comprising:
- detecting, with one or more sensors, a wrapped geometric form factor defined by a flexible display supported by a deformable housing while in a flashlight mode of operation;
- presenting, with one or more processors, flashlight output on the flexible display in a first location;
- also detecting, with one or more other sensors, gesture input translating the electronic device in three-dimensional space while the wrapped geometric form factor is occurring; and
- moving, by the one or more processors, the flashlight output on the flexible display in response to the translating to a second location as a function of a change in orientation of the electronic device in three-dimensional space resulting from the translating;
- wherein the gesture input comprises a lifting operation elevating the electronic device from a first position to a second position in the three-dimensional space.

22. An electronic device, comprising:
- a deformable housing comprising a plurality of linkage members;
- a flexible display supported by the deformable housing;
- one or more sensors operable to determine a wrapped, wrist-worn geometric configuration of the electronic device;
- one or more other sensors operable to detect when the electronic device changes orientation in three-dimensional space; and
- one or more processors operable with the one or more sensors and the one or more other sensors, the one or more processors operable to cause a flashlight output on the flexible display to move along the flexible display as a function of the changes in the orientation of the electronic device in the three-dimensional space while the electronic device is in the wrapped, wrist-worn geometric configuration;
- wherein the changes in the orientation of the electronic device comprise a lifting operation elevating the electronic device from a first position to a second position in the three-dimensional space.

* * * * *